(12) United States Patent
Shin et al.

(10) Patent No.: US 10,448,001 B2
(45) Date of Patent: Oct. 15, 2019

(54) DISPLAY DEVICE AND DISPLAYING METHOD FOR GLASS FREE STEREOSCOPIC IMAGE

(71) Applicant: MOPIC CO., LTD., Suwon-si (KR)

(72) Inventors: Chang Bong Shin, Suwon-si (KR); Yoon Cheol Shin, Seongnam-si (KR)

(73) Assignee: MOPIC CO., LTD., Suwon-si (KR)

( * ) Notice: Subject to any disclaimer, the term of this patent is extended or adjusted under 35 U.S.C. 154(b) by 149 days.

(21) Appl. No.: 15/346,035

(22) Filed: Nov. 8, 2016

(65) Prior Publication Data

US 2017/0353716 A1 Dec. 7, 2017

(30) Foreign Application Priority Data

Jun. 3, 2016 (KR) .................. 10-2016-0069372
Jun. 3, 2016 (KR) .................. 10-2016-0069378
Jun. 23, 2016 (KR) .................. 10-2016-0078744

(51) Int. Cl.
*H04N 13/04* (2006.01)
*H04N 13/327* (2018.01)
*H04N 13/305* (2018.01)
*G06F 3/0482* (2013.01)

(52) U.S. Cl.
CPC ......... *H04N 13/327* (2018.05); *H04N 13/305* (2018.05); *G06F 3/0482* (2013.01); *H04N 2213/001* (2013.01)

(58) Field of Classification Search
CPC ............... H04N 13/305; H04N 13/327; H04N 2213/001; G06F 3/0482
See application file for complete search history.

(56) References Cited

U.S. PATENT DOCUMENTS

2013/0321246 A1* 12/2013 Li .................. G09G 3/003
345/31
2014/0176676 A1* 6/2014 Lin .................. H04N 13/0468
348/46
2015/0370079 A1* 12/2015 Shin .................. G02B 27/2214
359/463

(Continued)

FOREIGN PATENT DOCUMENTS

| CN | 102088638 | 6/2011 |
| CN | 102158721 | 8/2011 |
| CN | 102572483 | 7/2012 |

(Continued)

OTHER PUBLICATIONS http://www.cdnews.co.kr/blog/blogOpenView.html?idxno=301777, Samsung Newsroom, Apr. 6, 2016.

*Primary Examiner* — Sathyanaraya V Perungavoor
*Assistant Examiner* — Peet Dhillon
(74) *Attorney, Agent, or Firm* — Cantor Colburn LLP

(57) ABSTRACT

Provided is a glass-free stereoscopic image display device herein. The glass-free stereoscopic image display device may include: a display module that displays a stereoscopic image through a cover including a lenticular lens including multiple convex lenses; and a processor that controls the display module, wherein the processor provides a stereoscopic image by controlling a left-eye image pixel and a right-eye image pixel of the display module on the basis of a lens pitch indicating a distance between the multiple convex lenses, and the cover is provided on a front surface of the user device to be combined with the user device.

14 Claims, 34 Drawing Sheets

(56) References Cited

U.S. PATENT DOCUMENTS

2016/0077349 A1* 3/2016 An ..................... G02B 27/2214
                                                        348/55

FOREIGN PATENT DOCUMENTS

| | | |
|---|---|---|
| CN | 103916655 | 7/2014 |
| CN | 104539923 | 4/2015 |
| CN | 104601981 | 5/2015 |
| CN | 105103032 | 11/2015 |
| CN | 105430369 | 3/2016 |
| JP | 2008015063 | 1/2008 |
| KR | 20070111763 | 11/2007 |
| KR | 20130043836 | 5/2013 |
| KR | 20150145160 | 12/2015 |
| KR | 20160024367 | 3/2016 |

* cited by examiner a-a'

FIG. 28C

DISPLAY DEVICE AND DISPLAYING METHOD FOR GLASS FREE STEREOSCOPIC IMAGE

CROSS-REFERENCE TO RELATED APPLICATION

This application claims the benefit under 35 USC 119(a) of Korean Patent Application No. 10-2016-0069372 filed on Jun. 3, 2016, Korean Patent Application No. 10-2016-0069378 filed on Jun. 3, 2016 and Korean Patent Application No. 10-2016-0078744 filed on Jun. 23, 2016 in the Korean Intellectual Property Office, the entire disclosures of which are incorporated herein by reference for all purposes.

TECHNICAL FIELD

The present disclosure relates to a display device and a displaying method for a glass-free stereoscopic image and more particularly, to a display device and a displaying method for providing an optimized glass-free stereoscopic image through a mobile device such as a smart phone or a tablet PC.

BACKGROUND

A 3D display (i.e., stereoscopic image display device) refers to the whole system that enables a user to feel a virtual three-dimensional effect by flat display hardware using binocular disparity generated when a human's eyes are away from each other by about 65 mm in a horizontal direction, among various factors allowing the user to feel the three-dimensional effect. In other words, although a human's eyes view the same object, they see slightly different images (more correctly, horizontal spatial information is slightly divided) due to the binocular disparity. When the two images are delivered to the brain through the retina, the brain precisely unites the two images to allow the user to feel a three-dimensional effect. Based on this, a 2D display device is designed to simultaneously display two left and right images and deliver them to the respective eyes to create a virtual three-dimensional effect, which is called a stereoscopic image display device.

In order to display images of two channels on a single screen in the stereoscopic image display device, in most cases, a channel is output at a time, while changing the lines in one of horizontal or vertical direction on the single screen. When images of two channels are simultaneously output from the single display device, in case of a glass-free scheme, the right image is delivered to the right eye as it is while the left image is delivered only to the left eye, in terms of the hardware structure.

As a representative glass-free method, there has been known a lenticular lens scheme in which a lenticular lens plate on which cylindrical lenses are vertically arranged is installed in front of a display panel. Such a glass-free stereoscopic image display device has been mainly developed in the field of large-scale display devices such as TVs.

SUMMARY

In view of the foregoing, the present disclosure provides a display device and a displaying method for providing a glass-free stereoscopic image through a mobile device such as a smart phone or a tablet PC.

According to a first exemplary embodiment of the present disclosure, a glass-free stereoscopic image display device may include: a display module that displays a stereoscopic image through a cover including a lens sheet including multiple lenticular lenses; and a processor that controls the display module, wherein the processor provides a stereoscopic image by controlling a left-eye image pixel and a right-eye image pixel of the display module on the basis of a lens pitch indicating a distance between the multiple lenticular lenses, and the cover is provided on a front surface of the user device to be combined with the user device.

According to a second exemplary embodiment of the present disclosure, a glass-free stereoscopic image display method performed by a processor of a user device may include: providing a stereoscopic image by controlling a left-eye image pixel and a right-eye image pixel of a display module of the user device, wherein in the providing of a stereoscopic image, when an image displayed on the display module is converted into a stereoscopic image through a cover provided on a front surface of the user device and including multiple lenticular lenses and then provided to a user, the display module is controlled on the basis of a lens pitch indicating a distance between the multiple lenticular lenses.

According to a third exemplary embodiment of the present disclosure, a glass-free stereoscopic image display device may include: a cover provided on a front surface of the user device to be combined with the user device, wherein the cover includes a main body covering the front surface of the user device and configured to be combined with the user device and a lens sheet located within or under the main body and including multiple lenticular lenses, and the cover coverts an image provided on a left-eye image pixel and a right-eye image pixel of a display module of the user device through the lens sheet into a stereoscopic image.

According to the present disclosure, a lenticular lens is inserted in a mobile cover commonly used by mobile users, and, thus, the users can readily enjoy stereoscopic image contents on mobile devices anywhere and at any time.

Further, according to the present disclosure, it is possible to improve the resolution of a stereoscopic image provided on a mobile device, provide a vivid stereoscopic image by adjusting a rendering pitch of a display module and performing eye-tracking, and also offset misalignment between a position of a lenticular lens within a cover and ON/OFF positions of a display.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 28A through FIG. 28C are diagrams provided to explain a method of correcting misalignment between a position of a lens and ON/OFF positions of a display in accordance with another exemplary embodiment of the present disclosure.

DETAILED DESCRIPTION

Figure 1:
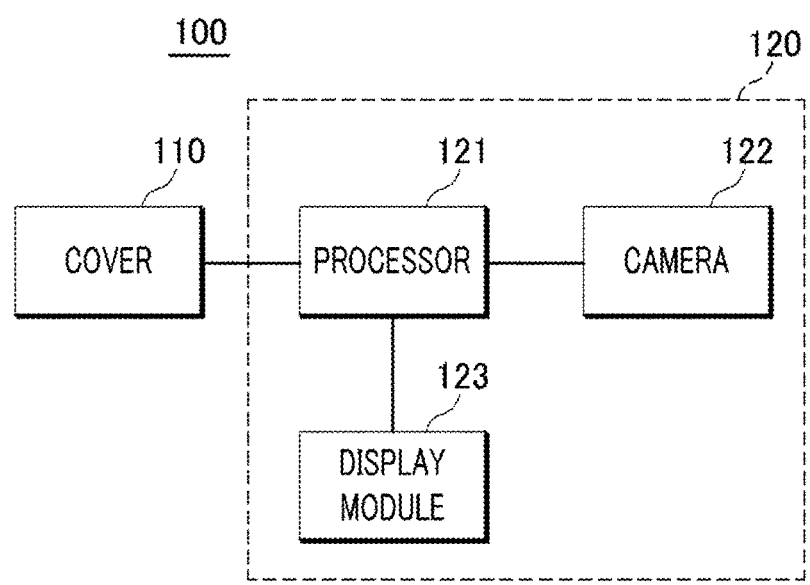
FIG. 1 is a configuration view of a glass-free stereoscopic image display device in accordance with an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

A "user device" to be described below may be implemented with computers or portable devices which can access a server or another device through a network. Herein, the computers may include, for example, a notebook, a desktop, and a laptop equipped with a WEB browser. For example, the portable devices are wireless communication devices that ensure portability and mobility and may include all kinds of handheld-based wireless communication devices such as a communication-based device, a smart phone, a tablet PC, and the like.

Hereinafter, an exemplary embodiment of the present disclosure will be described in detail with reference to the accompanying drawings.

Referring to FIG. 1, a glass-free stereoscopic image display device 100 in accordance with an exemplary embodiment of the present disclosure includes a cover 110, a processor 121, a camera 122, and a display module 123.

The cover 110 is configured to cover a display area of a user device 120 in order to protect the outside of the user device 120. The cover 110 may be manufactured separately from the user device 120 and then combined with the user device 120.

The user device 120 may include the processor 121, a memory (not illustrated), and the display module 123. Herein, the memory stores therein a program (or application) for performing a glass-free stereoscopic image display method, and when the program is executed by the processor 121, a stereoscopic image can be provided through the display module 123. Herein, the display module 123 is a module configured to output an image, and if implemented as a touch-type module, it may receive a user input. Herein, stereoscopic image contents provided by the program (or application) may be previously stored in the user device 120 or received from a content providing server (not illustrated). That is, the content providing server includes multiple glass-free stereoscopic image contents and a user can access the content providing server through the program (or application) and check and play a glass-free stereoscopic image content.

Meanwhile, the camera 122 may be built in the user device 120 or may be implemented as a separate external camera which can be detachably mounted on the user device 120. For example, if the user device 120 is a smart phone or a tablet PC, the camera 120 may be implemented as a built-in camera.

The glass-free stereoscopic image display device 100 in accordance with an exemplary embodiment of the present disclosure is a lenticular lens 210-type device, and the lenticular lens 210 is located within the cover 110.

Hereinafter, a structure of the cover 110 will be described in detail with reference to FIG. 2 through FIG. 4.

Figure 2:
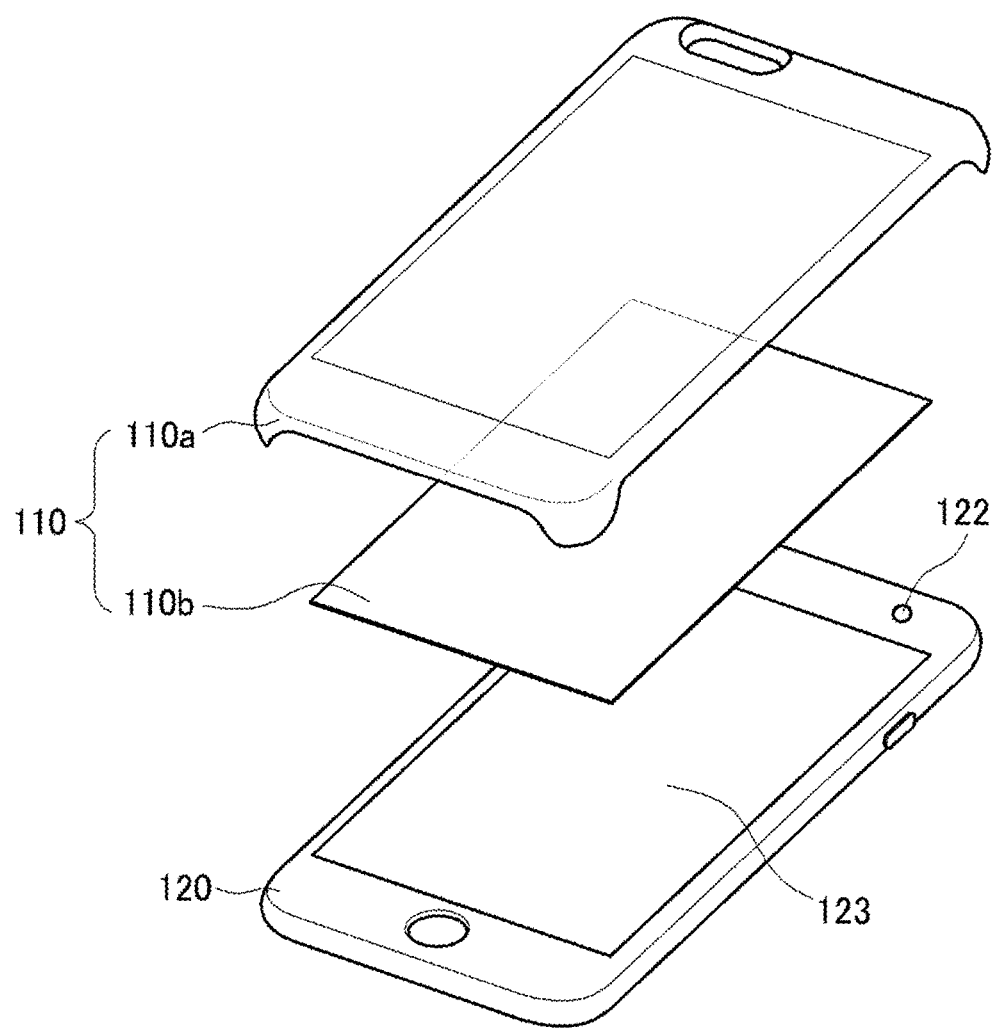
FIG. 2 is an exploded perspective view of a cover including a lenticular lens in accordance with an exemplary embodiment of the present disclosure.

Referring to FIG. 2, the cover 110 may include a main body 110a and a lens sheet 110b.

The main body 110a may be formed to have a size and a shape suitable to be combined with a front surface of the user device 120. For example, as shown in FIG. 2, the main body 110a may be formed to have downwardly protruding apexes with engagement parts and thus can be entirely fastened to the user device 120.

The lens sheet 110b is located under the main body 110a or within the main body 110a, and includes a lenticular lens 210.

Meanwhile, the cover 110 illustrated in FIG. 2 may be a double-face combination cover. Specifically, if the user device 110 is an iOS-based smart device, since a rear-facing camera 122 is located at an uppermost end of one side of a rear surface, the rear-facing cover 110 has an opening at the uppermost end of the one side to expose the rear-facing camera 122. In this case, even if the rear-facing cover 110 is attached to the front surface of the user device 120, the opening is located above the display area, and, thus, the rear-facing cover 110 can be used as the front-facing cover 110 as it is.

Figure 3:
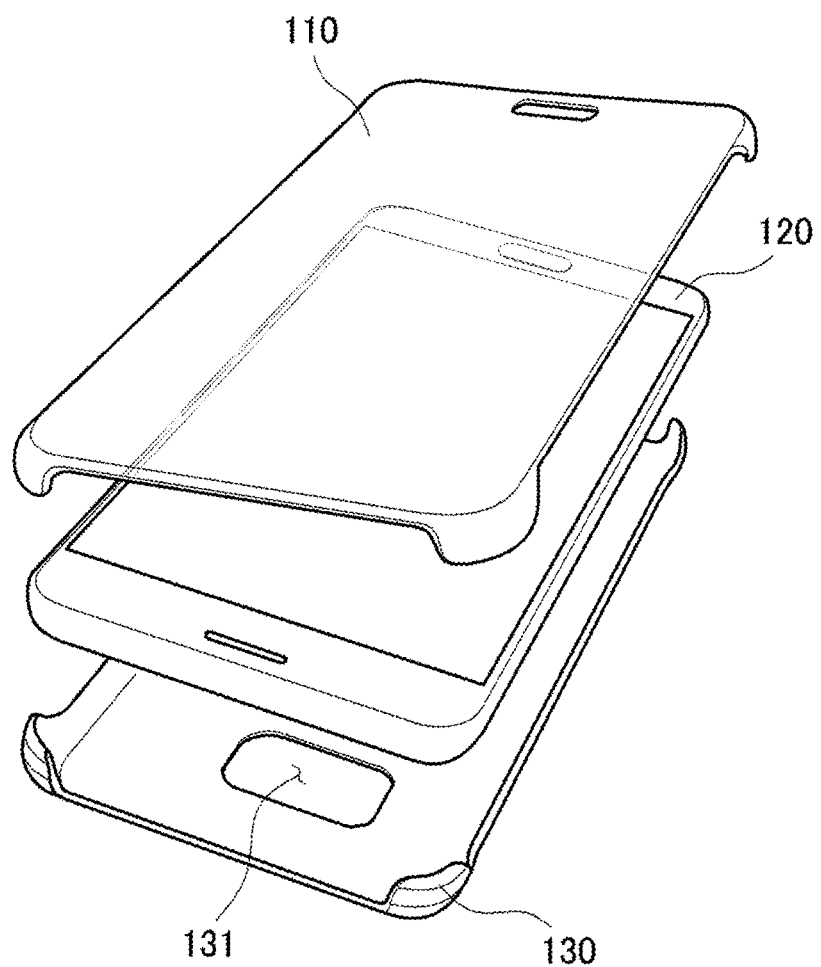
FIG. 3 is a configuration view of a cover in accordance with another exemplary embodiment of the present disclosure.

Meanwhile, the cover 110 illustrated in FIG. 3 may be a single-face combination cover 110. Specifically, if the user device 120 is a smart device in which the rear-facing camera 122 is located between an upper end and the middle of the rear surface from among android-based smart devices, the rear-facing cover 110 may have an opening 131 between the upper end and the middle of the rear surface to expose the rear-facing camera 122. In this case, if the rear-facing cover 110 is attached to the front surface of the user device 110, the opening 131 is overlapped with the display area, and, thus, the display area has a blank space where the lenticular lens 210 cannot be arranged.

Therefore, the cover 110 may be configured as a front-face combination cover, and, thus, it is difficult to combine the cover 110 directly with the rear surface of the user device 120. Accordingly, a rear-facing auxiliary cover 130 is further provided to be combined with the rear surface of the user device 120 and the cover 110 is combined with the rear-facing auxiliary cover 130, so that a double-face combination function of the cover 110 can be achieved.

In addition, if a stereoscopic photo the user wants is printed on the rear-facing auxiliary cover 130 and the cover 110 is combined with the rear-facing auxiliary cover 130, an additional function that enables the user to enjoy the stereoscopic photo may be provided by a combination of the stereoscopic photo with the lenticular lens 210 of the cover 110.

Figure 4:
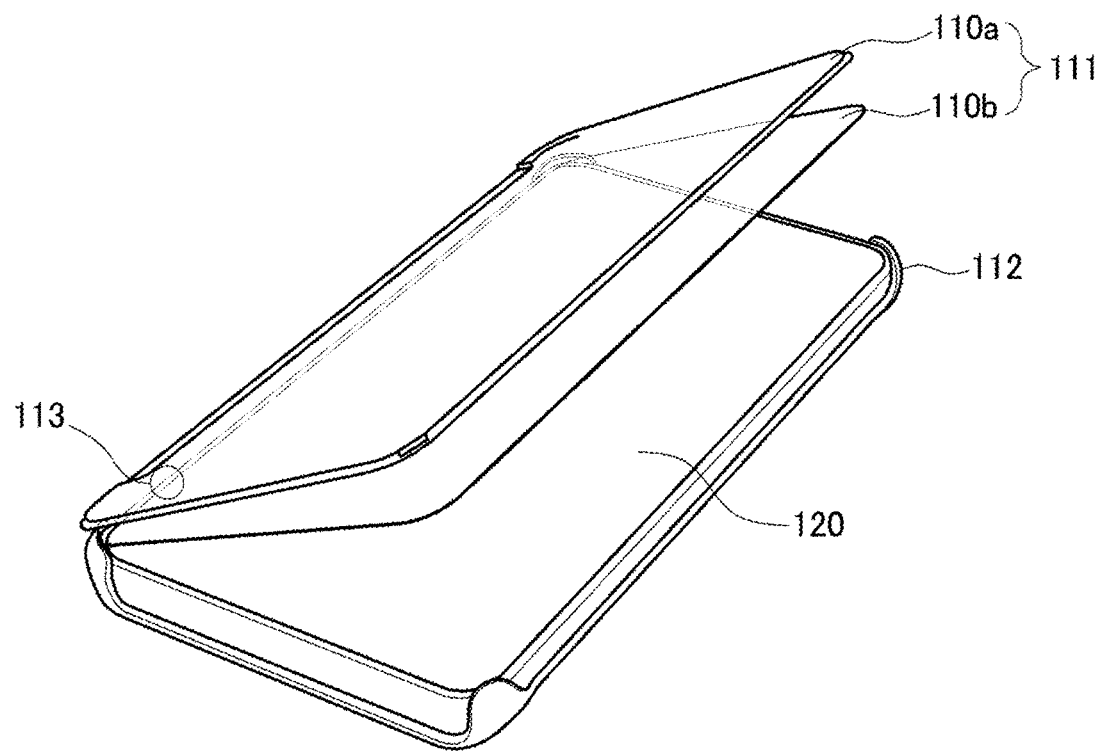
FIG. 4 is a configuration view of a cover in accordance with yet another exemplary embodiment of the present disclosure.

Meanwhile, the cover 110 may be a flip cover as illustrated in FIG. 4. The flip cover 110 is configured to be fixed on one side of the user device 120 and open and cover the front surface of the user device 120 in a hinged manner. The flip cover 110 may be divided into a cover part 111 and a case part 112. The cover part 111 includes the main body 110a and the lens sheet 110b and thus can be used as a means for providing a glass-free stereoscopic image. The case part 112 is manufactured to cover the outside of the user device 120 and combined with the user device 120 in order for the cover part 111 to be continuously fixed on one side of the user device 120.

Further, the flip cover 110 may include a hall sensor 113 in one area of the cover part 111. The hall sensor 113 functions to detect whether the cover part 111 is in contact with the display area of the user device 120, transfer a result of the detection to the user device 120, and convert a 2D image played on the user device 120 into a 3D image.

Further, apexes of the cover part 111 and the case part 112 of the flip cover 110 may have a separate structure in which the cover part 111 can be fixed to the case part 112 when the cover part 111 covers the front surface of the user device 120.

Meanwhile, in order to provide an excellent stereoscopic image, a distance between the lens sheet and a screen needs to be uniform. To this end, the lenticular lens needs to be attached as closely as possible to the screen of the user device.

A conventional flip cover does not need to be closely attached to a cover.

However, in accordance with an additional exemplary embodiment, in the flip cover or the front-face combination cover, the main body 110a combined with an upper part of the user device and an auxiliary cover (not illustrated) combined with a lower part of the user device may have flat front surfaces and edges extended from the front surfaces may be curved to cover a part of lateral surfaces of the user device. In this case, curved edges (corners) of the main body 110a and the auxiliary cover corresponding to the lateral surfaces of the user device may be configured to be in contact with each other. Further, magnets with different polarities may be mounted on the edges of the main body 110a and the auxiliary cover. For example, an N-pole magnet may be mounted on the main body 110a and an S-pole magnet may be mounted on the auxiliary cover. Thus, the edges of the main body 110a and the auxiliary cover can be closely attached to each other, so that the lens sheet 110b provided under the main body 110 can be closely attached to the screen of the user device. Meanwhile, instead of the magnets, hooks may be installed on the edges of the main body 110a and the auxiliary cover.

As such, in an exemplary embodiment of the present disclosure, the lenticular lens 210 is not built in the user device 120 but included in the form of a detachable module within the cover 110 of the user device 120, and, thus, a glass-free stereoscopic image system can be implemented at low costs. Further, the lenticular lens 210 is inserted in the cover 110 commonly used by users, and, thus, the users can readily enjoy a stereoscopic image on mobile devices anywhere and at any time. Furthermore, the cover 110 can be configured as a double-face combination cover or the cover 110 can be combined with both surfaces using the rear-facing auxiliary cover 130, and, thus, the user can easily carry and use the cover 110.

Hereinafter, an operation principle of the glass-free stereoscopic image display device in accordance with an exemplary embodiment of the present disclosure will be described in detail with reference to FIG. 5.

Figure 5:
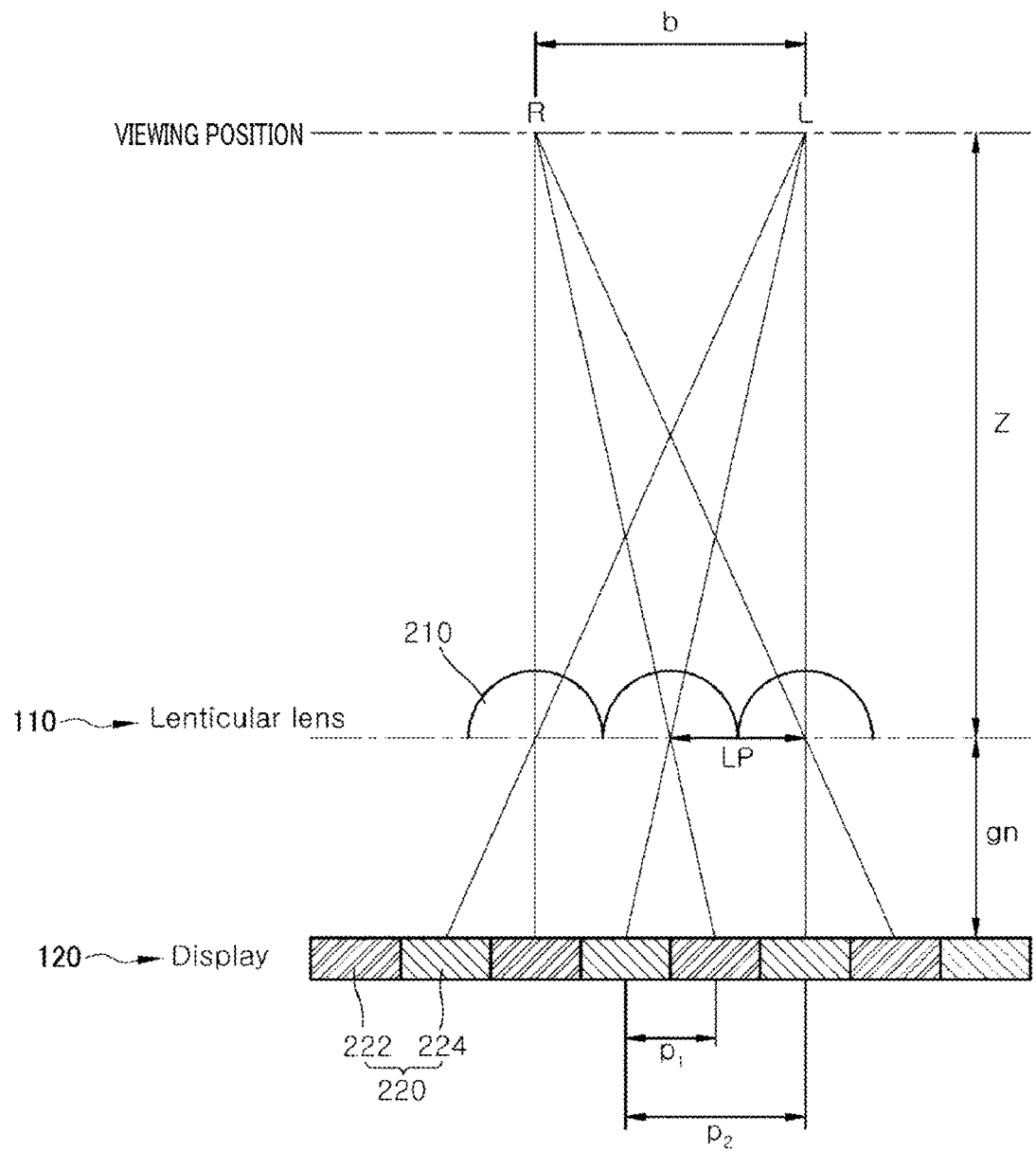
FIG. 5 is a conceptual diagram provided to explain the principle of implementing stereoscopic image display in accordance with an exemplary embodiment of the present disclosure.

In FIG. 5, a viewing position refers to a position where the right eye and the left eye of the user are placed, the lenticular lens 210 refers to the lens sheet 110b of the cover 110, and the display refers to the display module 123 of the user device 120. The lens sheet 110b has a structure in which multiple convex lenses 210 are arranged side by side, and the display module 123 includes pixels 220, i.e., multiple first and second mapping patterns 222 and 224, for implementing colors corresponding to a stereoscopic image. The first and second mapping patterns 222 and 224 are arranged alternately and configured to be provided to the respective eyes of the user.

A stereoscopic image may be provided to the user by separately defining the first mapping pattern provided to the right eye of the user and the second mapping pattern provided to the left eye of the user and projecting the first and second mapping patterns onto the respective eyes through the lens sheet 110b.

In this case, in order to view a more vivid glass-free stereoscopic image through the user device 120 and the lens sheet 110b placed on the screen of the user device 120, it is necessary to adjust a position of the lenticular lens 210 and a position of the first and second mapping patterns 222 and 224.

For example, a pixel (i.e., second mapping pattern 224) for a left eye L may be present at a position for a right eye R or may deviate from a desired position. In order for the second mapping pattern 224 to be placed at the position for the left eye L, a method of moving the lenticular lens 210 may be considered. However, the lens sheet 110b is already fixed at one position. Thus, it is difficult to implement such a method. This means that a lens pitch LP' indicating a distance between the lenticular lenses 210 included in the lens sheet 110b has a fixed value.

Therefore, in accordance with an exemplary embodiment of the present disclosure, even when the lenticular lens 210 are fixed, an optimal stereoscopic image is provided to the user.

Figure 7:
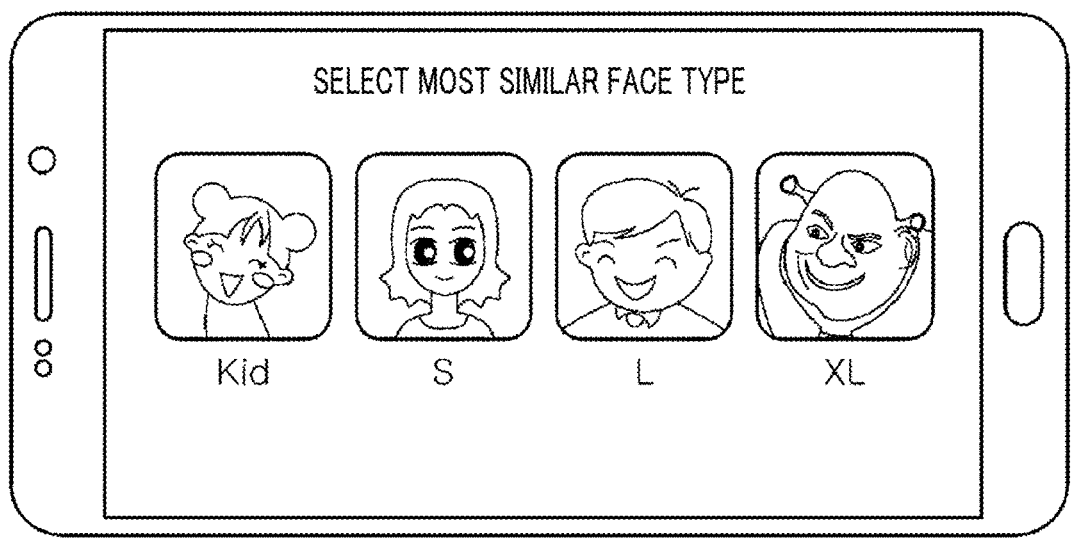

Firstly, the processor 121 provides a user interface as shown in FIG. 7 and thus may receive a glabella width from the user. That is, since a glabella width varies from person to person and it is difficult for the user to numerically measure his/her glabella width, a glabella width is previously set for each face size. Thus, when the user selects a face size, a standard glabella width is automatically input.

For example, referring to FIG. 7, if Kid is selected, 60 mm is input as a glabella width b, and if S is selected, 63 mm is input as the glabella width b. Further, if L is selected, 65 mm is input as the glabella width b, and if XL is selected, 67 mm is input as the glabella width b.

This method of selecting a face size makes it considerably easy for most users who do not know their glabella width b to input their glabella width b, and provides a much better viewing environment than a viewing environment using a uniformly fixed glabella width b.

Then, the processor 121 adjusts a rendering pitch $P_2$ of the display module 123 on the basis of the glabella width b and a predetermined lens pitch LP'.

Specifically, the processor 121 may calculate a distance $P_1$ between the first and second mapping patterns 222 and 224 adjacent to each other from among the multiple first and second mapping patterns 222 and 224 and the rendering pitch $P_2$ indicating a distance between the multiple second mapping patterns 224 on the basis of the lens pitch LP' and the glabella width b. In this case, the processor 121 may perform calculation using a triangle proportion between the calculated distance $P_1$ and rendering pitch $P_2$ illustrated in FIG. 5.

The distance $P_1$ between the first and second mapping patterns 222 and 224 and the rendering pitch $P_2$ are obtained from a proportional expression (Equation 1) among the lens pitch LP', the glabella width b, a viewing distance Z, and an optical distance gn using the triangle proportion illustrated in FIG. 5.

$$P_1 = (LP'*b))/(2b-LP') \quad \text{[Equation 1]}$$

The rendering pitch $P_2$ is two times greater than $P_1$ and thus can be expressed by a function relative to the lens pitch LP' and the glabella width b in the same manner as $P_1$. Thus, the rendering pitch $P_2$ can be obtained.

In a state where the rendering pitch $P_2$ is adjusted, the processor 121 may calculate a first viewing distance (optimal viewing distance) Z indicating a distance at which the user can view the most vivid stereoscopic image through the user device 120, on the basis of the glabella width b, the lens pitch LP', and the optical distance gn indicating a distance between the lenticular lens 210 and the display module 123 of the user device 120. Herein, the optical distance gn may be a value calculated (fixed) in consideration of a refractive index and a physical distance from the lenticular lens 210 and the display module 123.

The glabella width b, the lens pitch LP', and the optical distance gn are already determined values. Thus, according to Equation 1, the first viewing distance Z can be expressed by Equation 2.

$$Z=(2b*gn)/LP'-gn \quad \text{[Equation 2]}$$

The processor 121 may calculate the first viewing distance Z by substituting predetermined values for the glabella width b, the lens pitch LP', and the optical distance gn, respectively, in Equation 2. The first viewing distance Z may be displayed on the screen of the user device 120 through the display module 123. Thus, the user can maintain the optimal viewing distance while checking display information, so that the user can view a vivid stereoscopic image.

Figure 6:
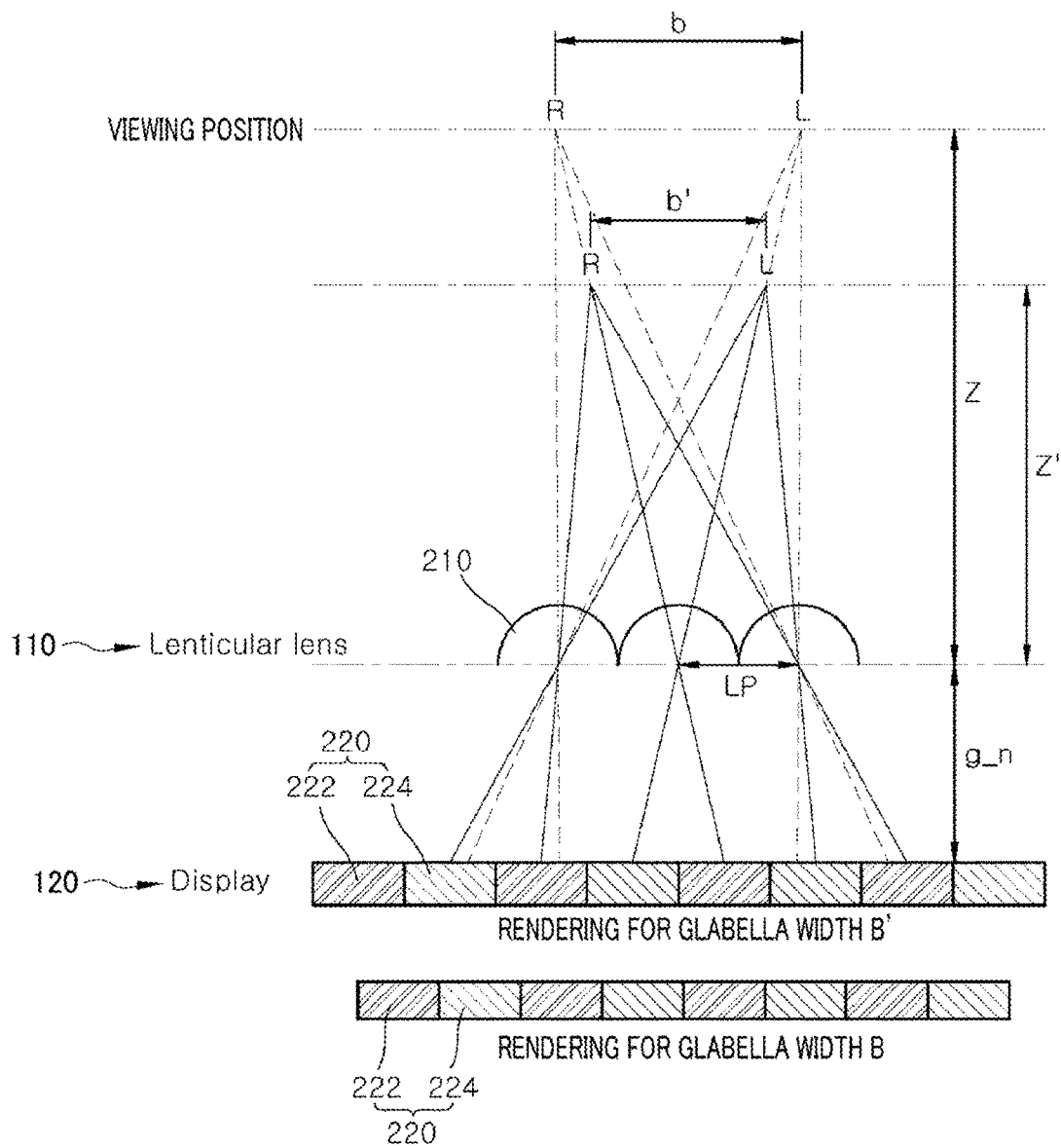
FIG. 6 and FIG. 7 are conceptual diagrams provided to explain a method of adjusting a glabella width in accordance with an exemplary embodiment of the present disclosure.

Then, the processor 121 may measure a second viewing distance Z' indicating an actual distance from the user device 120 to the user viewing a stereoscopic image through the user device 120 using the camera 122 as shown in FIG. 6, and compare the second viewing distance Z' with the first viewing distance Z.

Then, the processor 121 may provide a guide signal to guide the user to adjust the second viewing distance Z' of the user on the basis of a distance difference between the first viewing distance Z and the second viewing distance Z' through the display module 123.

For example, if the second viewing distance Z' is greater than the first viewing distance Z as a result of comparison between the first viewing distance Z and the second viewing distance Z', the processor 121 may provide the user device 120 with a guide signal to request the user to get closer to the screen of the user device 120. The guide signal may include coordinates of a focus for an optimal viewing distance and movable coordinates which move along a movement of the user's face, and may be provided to guide the movable coordinates to the same position as the focus coordinates. Therefore, the user can continuously view a vivid stereoscopic image by reducing an actual viewing distance.

As another example, if the second viewing distance Z' is smaller than the first viewing distance Z as a result of comparison between the first viewing distance Z and the second viewing distance Z', the processor 121 may provide the user device 120 with a guide signal to request the user to get farther from the screen of the user device 120. In other words, if an actual viewing distance is smaller than an optimal viewing distance, the processor 121 may provide the user device 120 with a guide signal to request the viewer's eyes to get farther from the user device 120. Therefore, the viewer can continuously view a vivid stereoscopic image by increasing the actual viewing distance.

Further, as yet another example, the processor 121 may not induce the user to the optimal viewing distance, but may adjust the rendering pitch to be suitable for an actual viewing distance of the user. Specifically, when the rendering pitch is adjusted, the user measures his/her actual viewing distance from the user device through a camera connected to the user device. Then, the user may adjust the rendering pitch of the display module on the basis of the actual viewing distance, a glabella width, a lens pitch, and an optical distance to a left-eye image pixel and a right-eye image pixel.

Meanwhile, since a glabella width varies from person to person, if the same user device 120 is used by different viewers, it is necessary to adjust a glabella width. In particular, there is a large difference between a child with a short glabella width and an adult male with a long glabella width. Therefore, in an exemplary embodiment of the present disclosure, it is possible to provide an environment where each viewer can view a complete stereoscopic image with less crosstalk through the same user device 120 by adjusting such a difference in glabella width. To this end, in an exemplary embodiment of the present disclosure, options (Kid, S, L, XL) for selecting a face size as shown in FIG. 7 can be displayed on the screen of the user device 120 through the display module 123 to be described later.

Meanwhile, if the glabella width is adjusted (changed), the processor 121 may adjust again the rendering pitch $P_2$ to be suitable for an adjusted glabella width b' as shown in FIG. 6. That is, as shown in FIG. 6, if the glabella width b' is selected or input as the glabella width b, there may be a change by applying b' as a reference glabella width. When the glabella width b is changed to b', since the lens pitch LP' and the optical distance gn are fixed physical values, only the rendering pitch $P_2$ can be changed. Therefore, in an exemplary embodiment of the present disclosure, if the glabella width is changed from b to b' in Equations 1 and 2, a new first viewing distance Z' and a new rendering pitch $P_2'$ can be calculated.

$$P_1 = (LP'/b')/(2b - LP') \qquad \text{[Equation 3]}$$

$$Z' = (2b'*gn)/LP' - gn \qquad \text{[Equation 4]}$$

If the glabella width is changed from b to b', the processor 121 may adjust again the rendering pitch $P_2'$ using Equations 3 and 4. Thus, in accordance with an exemplary embodiment of the present disclosure, it is possible to provide an optimal viewing environment to people with different glabella widths in the same user device 120.

In Equation 4, Z' represents a viewing distance at which the viewer has an optimal viewing environment along with the change in glabella width (b→b'), and indicates a state of the user (guide signal) if the viewer is farther from or closer to the user device 120 than Z' and thus serves as a reference to induce the viewer to an optimal viewing distance. Thus, in accordance with an exemplary embodiment of the present disclosure, it is possible to provide an optimal viewing environment to people with different glabella widths in the same user device 120.

Meanwhile, there may be a difference between the glabella width b input through the display module 123 and the actual glabella width of the user. For example, if a user with a glabella width b' views a stereoscopic image when a glabella width is set (input) as b, the user cannot see the center of the first and second mapping patterns 222 and 224 but can see edges, which can make it easy for left and right viewing zones to be mixed and cause a considerable reduction in width of the optimal viewing distance Z.

Figure 8A:
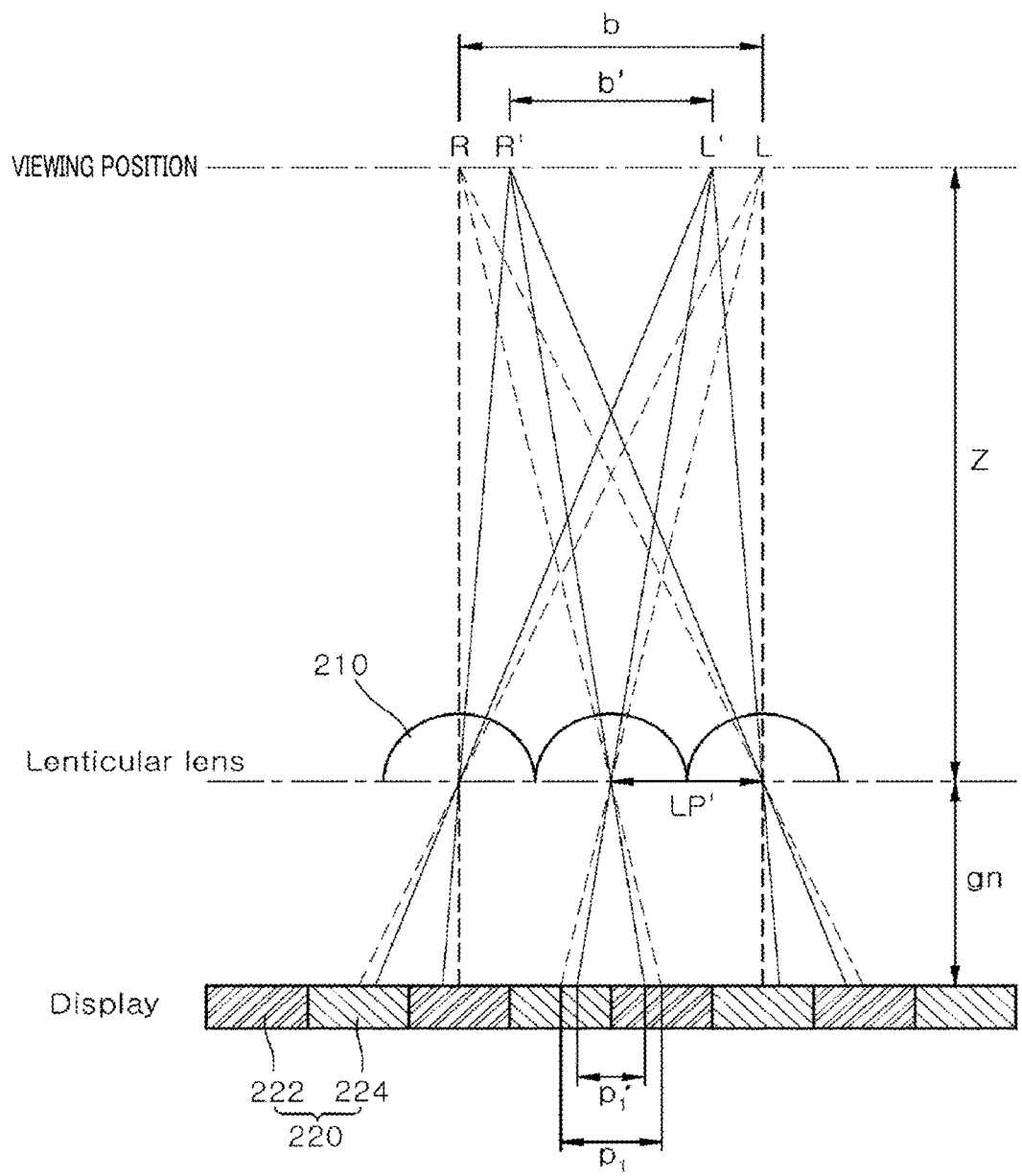
FIG. 8A and FIG. 8B are diagrams provided to explain a rendering mismatch caused by a change (error) in glabella width in accordance with an exemplary embodiment of the present disclosure.

Regarding a difference in glabella width, a method of measuring a viewing distance using a camera unlike FIG. 8A in which the same distance is given may be applied as follows.

Figure 8B:
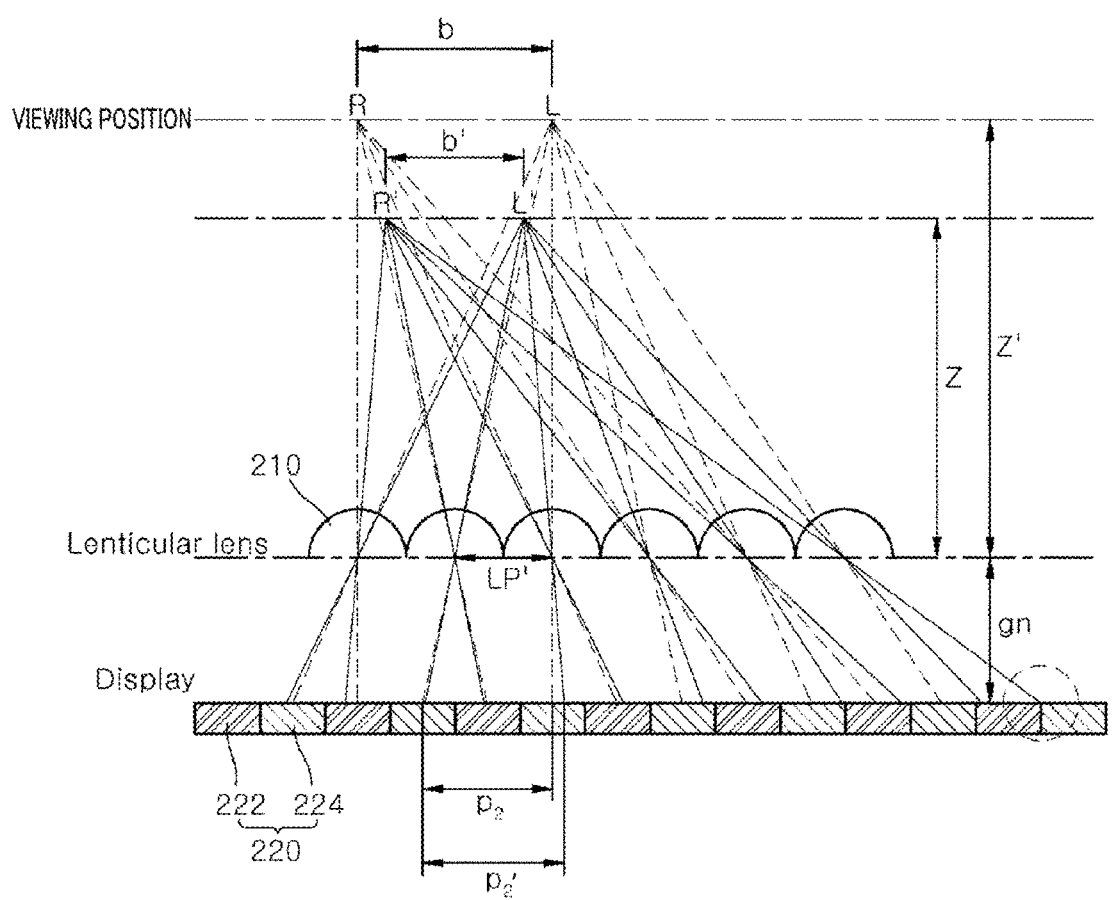

Referring to FIG. 8B, a glabella width is fixed as b and at that time, a viewing distance is Z. If a user with a glabella width b' (b' is assumed to be smaller than b in FIG. 8B) looks at the screen at the same viewing distance Z, the glabella width turns out to be smaller than a glabella width of a user with a glabella width b. Therefore, an optimal viewing distance is detected as being farther than Z, and, thus, the changed viewing distance Z' is input into the display module 123.

If the user with the glabella width b' looks at the screen at the distance Z from the screen, the user device 120 may recognize that the user with the glabella width b looks at the screen at the viewing distance Z' from the screen.

Thus, even if the user with the glabella width b' looks at the screen at positions R' and L', the user 120 recognizes R and L as positions and b as a glabella width and thus performs inappropriate rendering.

This may have a bad consequence in which at positions closer to the edges of the screen of the user device 120, the user gradually sees positions farther from the desired positions (first and second mapping patterns). That is, the viewer needs to see the first and second mapping patterns 222 and 224 as indicated by dotted lines, but it can be seen that when the viewer sees positions deviating from the first and second mapping patterns 222 and 224 to be closer to the edges as indicated by solid lines, the viewer turns to another mapping pattern. Therefore, in an exemplary embodiment of the present disclosure, it is possible for the user to continuously see the screen at an optimal viewing distance suitable for his/her glabella width and thus to view an image more comfortably. Hereinafter, an optimal viewing range will be described in detail with reference to FIG. 9 through FIG. 13.

Figure 9:
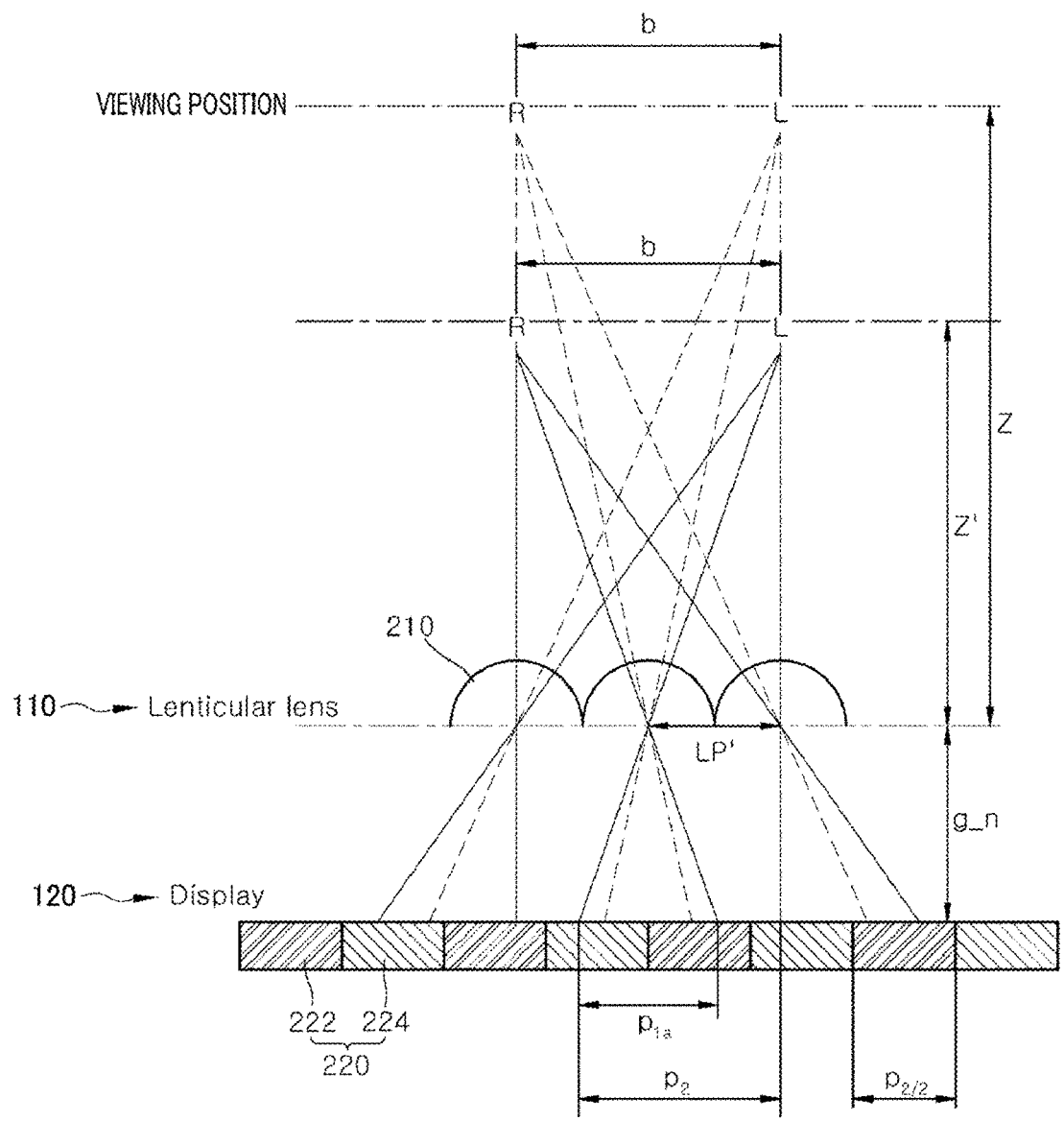
FIG. 9 through FIG. 11 are conceptual diagrams provided to explain a method of setting an optimal viewing range in accordance with an exemplary embodiment of the present disclosure.

Referring to FIG. 9, the user can see the center of the first mapping pattern 222 for the right eye R or the center of the second mapping pattern 224 for the left eye L at the optimal viewing distance Z. However, when a viewing distance is reduced from the optimal viewing distance Z to Z' or increased, the user sees the edges rather than the centers of the mapping patterns 222 and 224.

When a viewing distance is changed, positions in the mapping patterns 222 and 224 seen by the user can be obtained by calculation. Thus, a degree of deviation from the centers of the mapping patterns 222 and 224 depending on a viewing distance can be obtained as a function value as shown in Equation 5.

$$ER = (EL*2)/(0.5*P_2)*100(\%) \qquad \text{[Equation 5]}$$

Herein, if ER is 100%, the user sees another viewing zone. That is, if ER is 100%, the second mapping pattern 224 may be seen with the left eye L or the first mapping pattern 222 may be seen with the right eye R.

Figure 10:
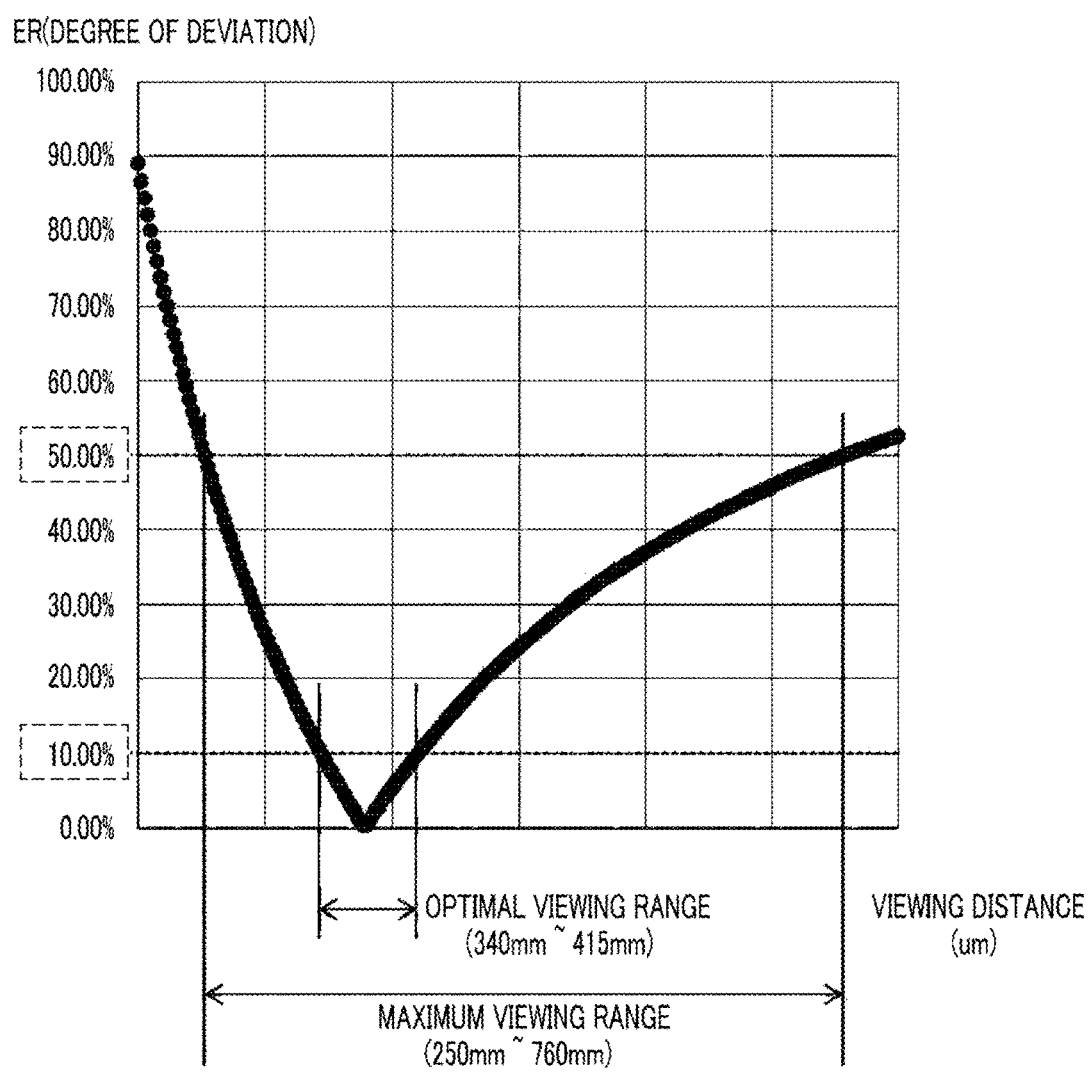

A viewing distance and ER may be displayed in a graph using the function of Equation 5, as shown in FIG. 10. The graph in FIG. 10 may be changed depending on an optimal viewing distance, display characteristics of the user device 120, an applied lens, and the like. In an exemplary embodiment of the present disclosure, an optimal viewing range may be selected at ER of 10% and a maximum viewing range may be selected at ER of 50%. However, these ranges may vary depending on an applied model (user device 120) and thus are determined through an experiment for each model.

In accordance with the present exemplary embodiment, within the optimal viewing range (10%), nothing is displayed on the screen of the user device 120, but at a viewing distance exceeding 10%, whether a current distance is farther or closer than the optimal viewing distance may be displayed. Further, at a viewing distance equal to or greater than 50%, a message "out of boundary" may be displayed on the screen, and the user may be guided to stay within the maximum viewing range and if possible, within the optimal viewing range.

Further, in order to more easily guide the user within the maximum (optimal) viewing range of the user, the processor 121 may display a bar, which shows a distance difference with respect to a viewing distance through the display module 123, on a display part of the user device 120.

To this end, the processor 121 measures an actual viewing distance between the user and the screen using the camera 122 of the user device 120. If the actual viewing distance is greater than the optimal viewing distance, the processor 121 may provide the user device 120 with a signal to get closer to the screen, and if the actual viewing distance is smaller than the optimal viewing distance, the processor 121 may provide the user device 120 with a signal to get farther from the screen. Thus, in accordance with an exemplary embodiment of the present disclosure, the processor 121 guides the user to know where the optimal viewing environment is provided.

In this case, the user device 120 displays the optimal viewing distance for the user to inform the user of an appropriate distance in the beginning, and then if it is determined that the user sufficiently perceives the optimal viewing distance, the user device 120 includes the user to press an OK button at the bottom to remove a BAR indicating a distance state. Herein, the user device 120 helps the user to maintain an appropriate viewing distance by allowing the BAR indicating a distance state to be displayed only when the actual viewing distance of the user deviates to a predetermined extent or more from the optimal viewing distance.

Meanwhile, the user may move back and forth while viewing an image as described above, or may move from side to side while viewing an image.

Figure 12:
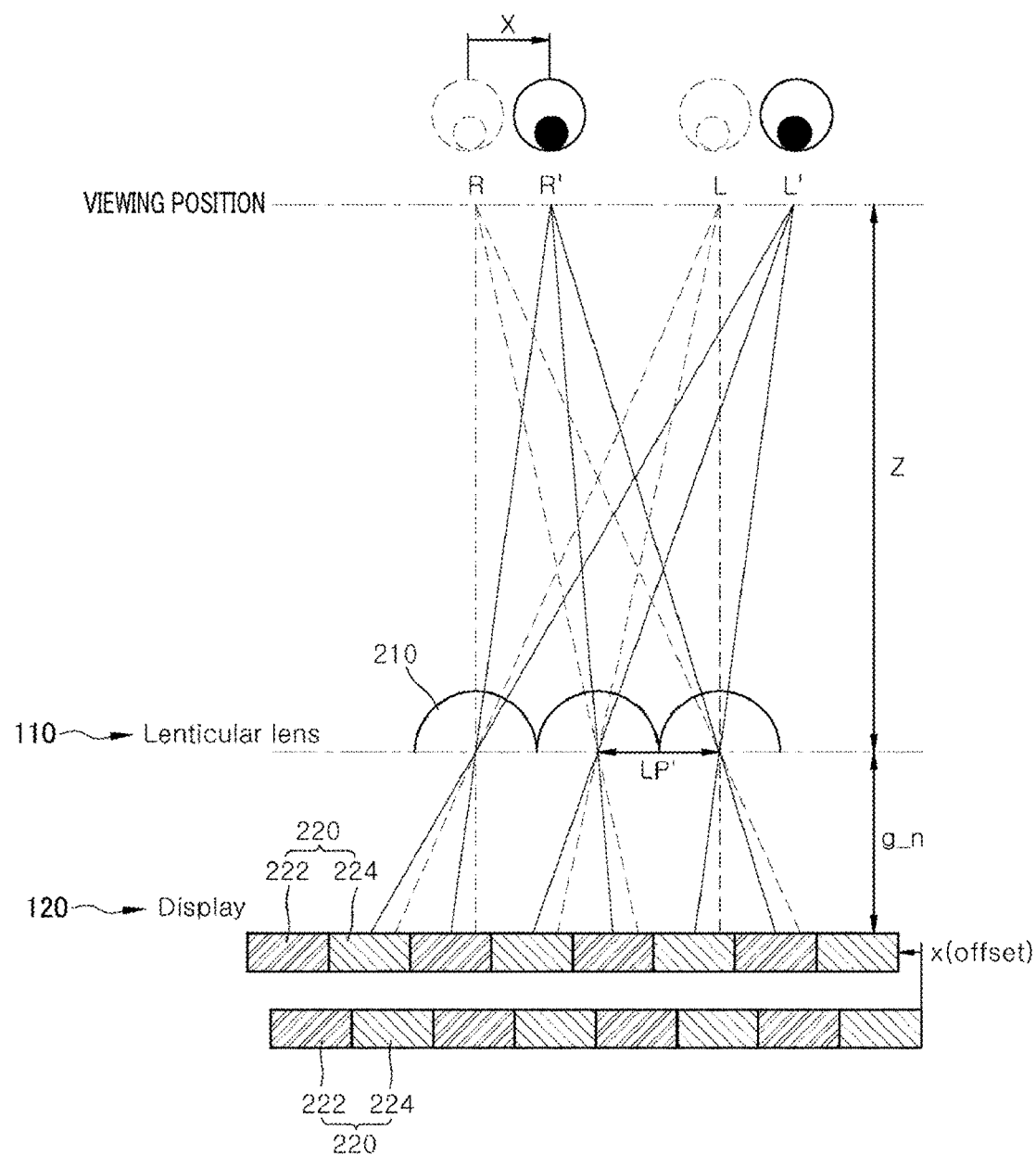
FIG. 12 is a conceptual diagram provided to explain an offset method for left and right movements of a user's face.

For example, as illustrated in FIG. 12, if the user moves from R-L to R'-L' by X in the right direction without a back-and-forth movement, the mapping patterns 222 and 224 need to move by x (offset value) in the opposite direction in order for the user to continuously view the same screen. In this case, the user views the screen at the position R-L as indicated by dotted lines and then views the screen at the position R'-L' as indicated by solid lines, and a value of x (offset value) varies depending on a movement distance X of the user. If a viewing distance moves back and forth, x (offset value) is also changed depending on the viewing distance. In an exemplary embodiment of the present disclosure, a movement direction and a movement distance of the user's eyes may be used to offset a difference caused by left and right movements of the user.

Specifically, the processor 121 performs eye tracking about the user's eyes using the camera 122 of the user device 120 to measure a movement direction and a movement distance of the user's eyes. As illustrated in FIG. 12, if the user moves from R-L to R'-L' by X, the movement direction is a right direction and the movement distance is X. The processor 121 calculates an offset (x) to be applied to the display module 123 on the basis of the measured movement distance and the glabella width, and moves the multiple first and second mapping patterns 222 and 224 alternately arranged on the display module 123 of the user device 120, by the offset value (x) in the opposite direction of the measured movement direction.

Herein, the method of calculating an offset value by measuring a movement distance of the viewer's eyes using the camera of the user device 120 may be performed using a trigonometric ratio. The movement distance X (mm) of the viewer's eyes may be calculated using the camera of the user device 120, and a movement amount of the mapping patterns corresponding to the movement distance X may be calculated using Equation 6.

$$gn:Z=-x:X \quad \text{[Equation 6]}$$

Meanwhile, if the viewing distance of the user is changed, the positions of the first and second mapping patterns 222 and 224 for the right eye R and the left eye L of the user are changed, so that the user may view a distorted stereoscopic image. Thus, it is necessary to offset distortion. That is, when the user sees the screen at a distance closer or farther than a reference (optimal) viewing distance, a method of offsetting a difference is needed.

Figure 13:
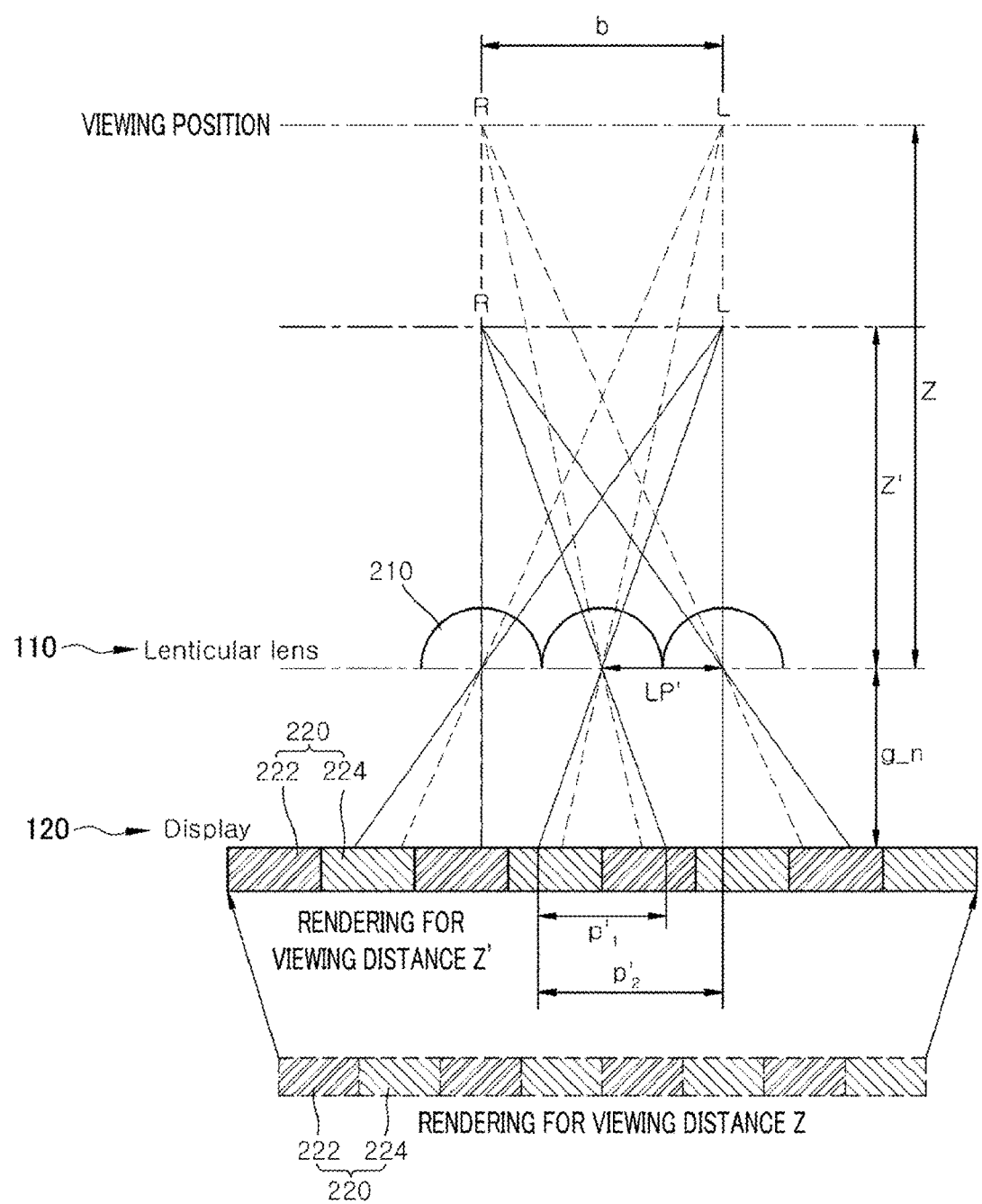
FIG. 13 is a diagram provided to explain an offset method for a change in viewing distance of a viewer.

As illustrated in FIG. 13, in accordance with an exemplary embodiment of the present disclosure, when the user is present at the distance Z' closer than the reference viewing distance Z, since the lens pitch LP' and the optical distance gn are fixed physical values and thus cannot be changed, the rendering pitch $P_2'$ which can be changed may be used to offset a change in viewing distance. Therefore, the processor 121 may apply the changed viewing distance Z' with the fixed lens pitch LP' and optical distance gn to Equation 7 to calculate the rendering pitch $P_2'$ of the display module 123 of the user device 120.

$$P_2'=[LP'*(Z'+gn)]/Z' \quad \text{[Equation 7]}$$

The processor 121 performs rendering using the rendering pitch $P_2'$ and thus enables the user to view a stereoscopic image in the same viewing zone in spite of a change in viewing distance.

The display module 123 may provide the first viewing distance (optimal viewing distance) calculated by the processor 121 to the user device 120 to display the first viewing distance to the viewer through a screen display part of the user device 120. The display module 123 may provide the first viewing distance (optimal viewing distance) calculated by the processor 121 to the user device 120 to display the first viewing distance to the viewer through the screen of the user device 120.

Figure 11:
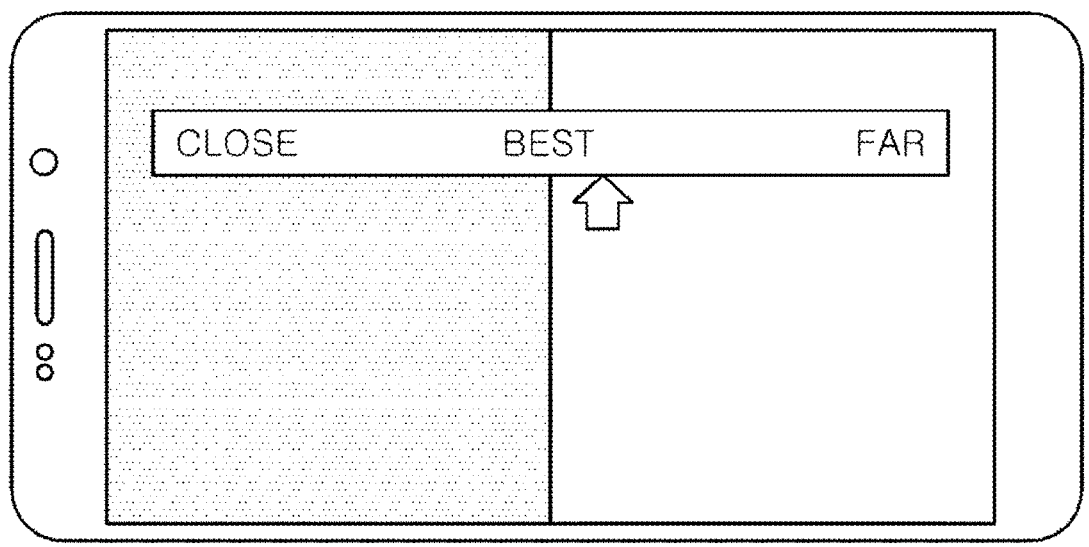

If a distance difference between the first viewing distance (optimal viewing distance) and the second viewing distance (actual viewing distance) is not included in a predetermined range as a result of comparison by the processor 121, the display module 123 may receive a guide signal from the processor 121 and display the bar which makes it possible to adjust the distance difference on the basis of the first viewing distance on the screen of the user device 120 (see FIG. 11).

The display module 123 may display options for selecting a face size on the screen of the user device 120. If any one face size is selected from the options, the display module 123 may receive a value corresponding to the selected face size as a glabella width.

The display module 123 may display an input button for inputting a numerical value on the screen of the user device 120. If an actual measurement value of a width between the viewer's pupils is input through the input button, the display module 123 may receive the input measurement value as a glabella width.

FIG. 14 provides flowcharts to explain a method of improving a customized viewing environment by a stereoscopic image display device in accordance with an exemplary embodiment of the present disclosure.

Figure 14A:
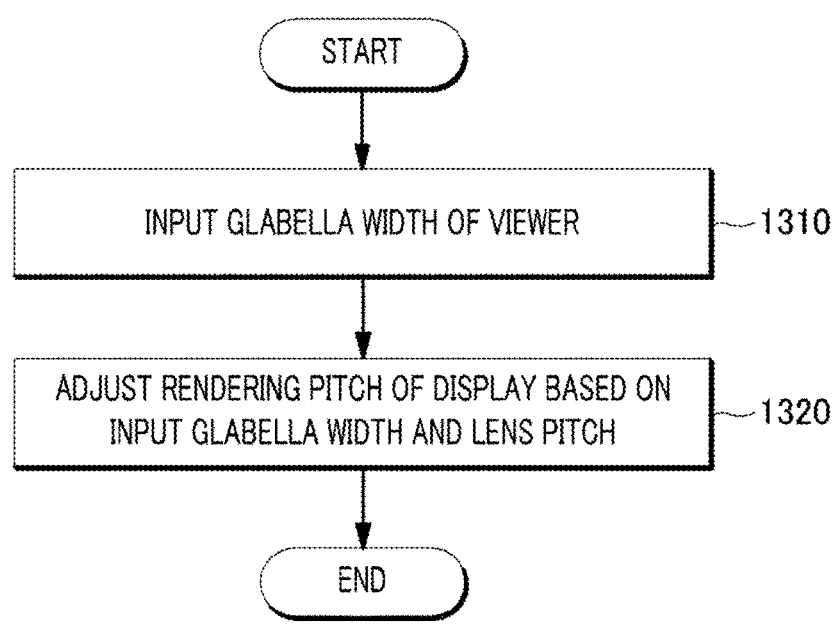
FIG. 14A through FIG. 14C are flowcharts provided to explain a method of improving a customized viewing environment by a stereoscopic image display device in accordance with an exemplary embodiment of the present disclosure.

Referring to FIG. 14A, the stereoscopic image display device receives a glabella width of the viewer in 1310.

Then, in 1320, the stereoscopic image display device adjusts a rendering pitch of a display on the basis of the input glabella width and a lens pitch which indicates a distance between multiple convex lenses provided on the lens sheet placed at a position corresponding to the display of the user device 120.

Figure 14B:
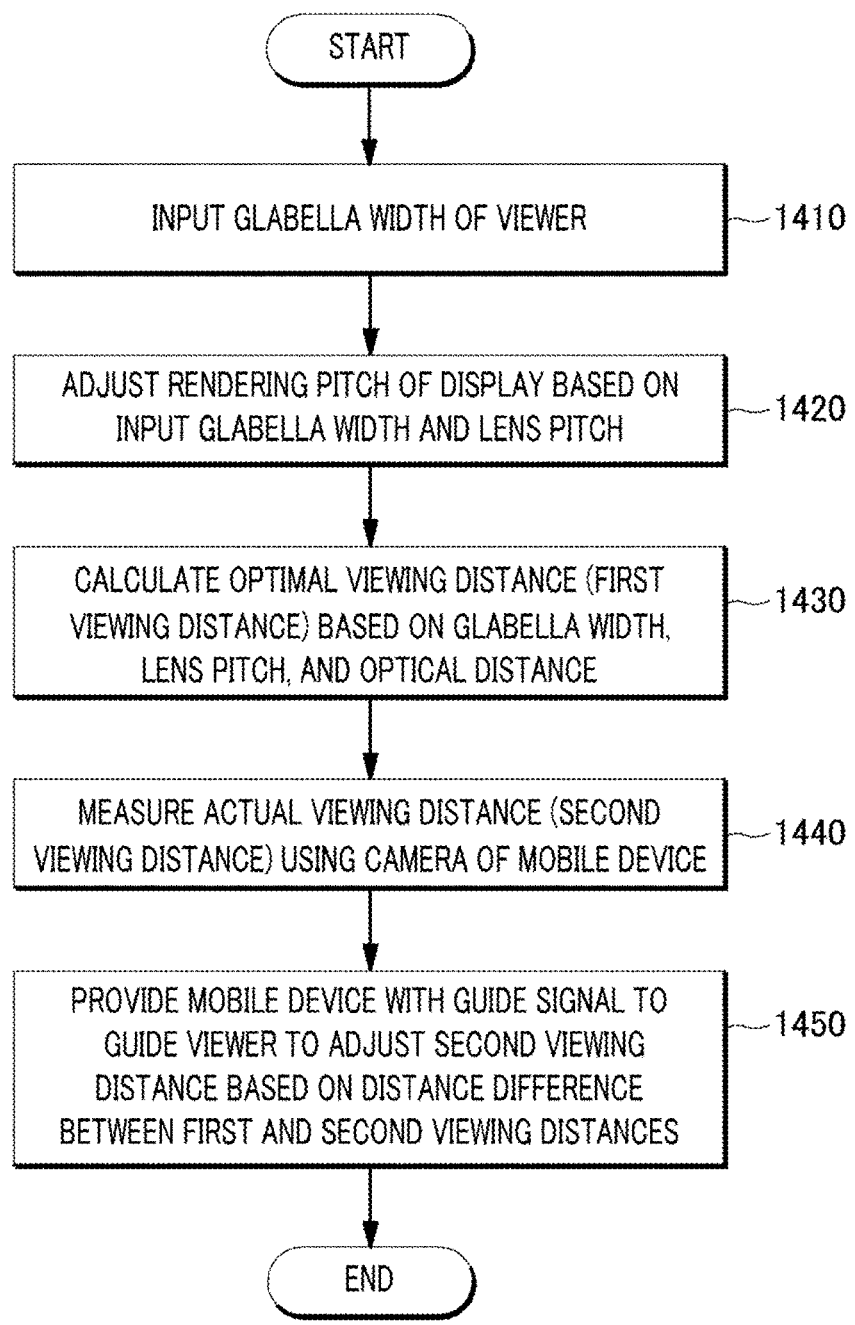

FIG. 14B is a flowchart provided to explain a method of improving a customized viewing environment by a stereoscopic image display device in accordance with another exemplary embodiment of the present disclosure.

Referring to FIG. 14B, the stereoscopic image display device receives a glabella width of the viewer in 1410.

Then, in 1420, the stereoscopic image display device adjusts a rendering pitch of a display of the user device 120 on the basis of the input glabella width and a lens pitch.

Then, in 1430, the stereoscopic image display device calculates a first viewing distance at which the viewer can view the most vivid stereoscopic image through the user device 120, on the basis of the glabella width, the lens pitch, and an optical distance indicating a distance between the convex lens and the display.

Then, in 1440, the stereoscopic image display device measures an actual viewing distance (second viewing distance) using the camera of the user device 120.

Then, in 1450, the stereoscopic image display device provides the user device with a guide signal for guiding the viewer to adjust the second viewing distance of the viewer on the basis of a distance difference between the first viewing distance and the second viewing distance.

Figure 14C:
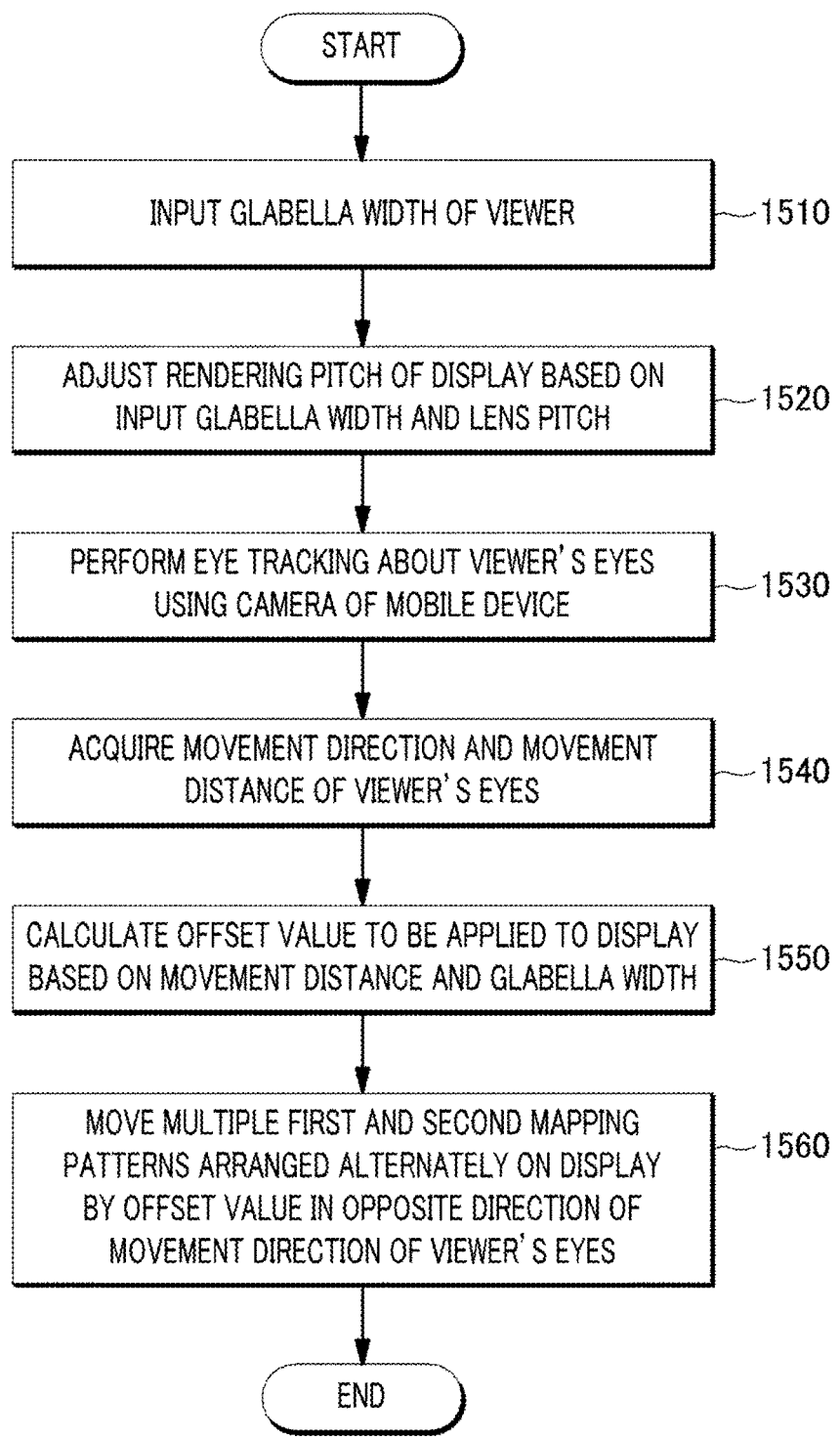

FIG. 14C is a flowchart provided to explain a method of improving a customized viewing environment by a stereoscopic image display device in accordance with yet another exemplary embodiment of the present disclosure.

Referring to FIG. 14C, the stereoscopic image display device receives a glabella width of the viewer in 1510.

Then, in 1520, the stereoscopic image display device adjusts a rendering pitch of a display on the basis of the input glabella width and a lens pitch which indicates a distance between multiple convex lenses provided on the lens sheet placed at a position corresponding to the display of the user device 120.

Then, in 1530, the stereoscopic image display device performs eye tracking about the viewer's eyes using the camera of the user device 120.

Then, in 1540, the stereoscopic image display device acquires a movement direction and a movement distance of the viewer's eyes measured by performing the eye tracking using the camera.

Then, in 1540, the stereoscopic image display device calculates an offset value to be applied to the display on the basis of the movement distance and the glabella width.

Then, in 1550, the stereoscopic image display device moves multiple first and second mapping patterns alternately arranged on the display, by the offset value in the opposite direction of the measured movement direction.

Hereinafter, a method of correcting misalignment by the stereoscopic image display device 100 in accordance with an exemplary embodiment of the present disclosure will be described in detail with reference to FIG. 15 through FIG. 21.

Figure 15:
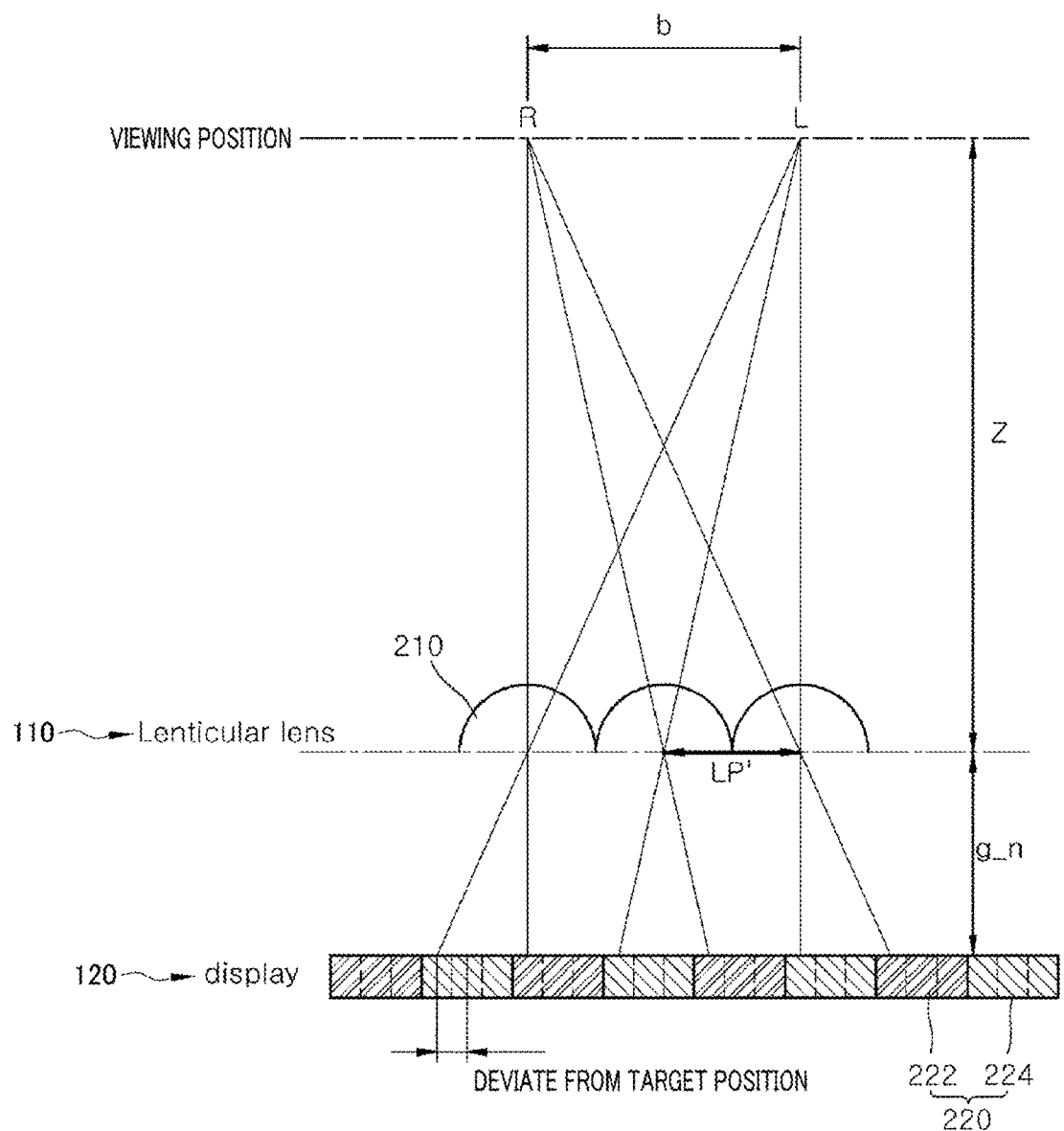
FIG. 15 through FIG. 18 are conceptual diagrams provided to explain a method of correcting misalignment between a position of a lens and ON/OFF positions of a display in accordance with an exemplary embodiment of the present disclosure.

Even if a rendering pitch $P_2$ of the display module 123 of the user device 120 is adjusted, when the lens sheet is attached to the user device 120, the lens sheet may deviate from a desired position. In this case, a position of the lenticular lens 210 of the lens sheet deviates from a pixel position of the display module 123, and, thus, as shown in FIG. 15, a pixel for the left eye L may be present at a position for the right R or may deviate from a target position. Therefore, it is necessary to mutually adjust the position of the lenticular lens 210 with positions (ON/OFF positions) of the pixel. However, it is difficult to adjust the position of the lenticular lens 210 since the lens sheet is attached and fixed to the user device 120.

Therefore, in an exemplary embodiment of the present disclosure, misalignment between the position of the lenticular lens 210 at the time of being attached to the lens sheet and the positions of the first and second mapping patterns can be corrected by adjusting the positions of the pixel, i.e., the positions of the first and second mapping patterns 222 and 224, of the display module 1233 of the user device 120.

Figure 16:
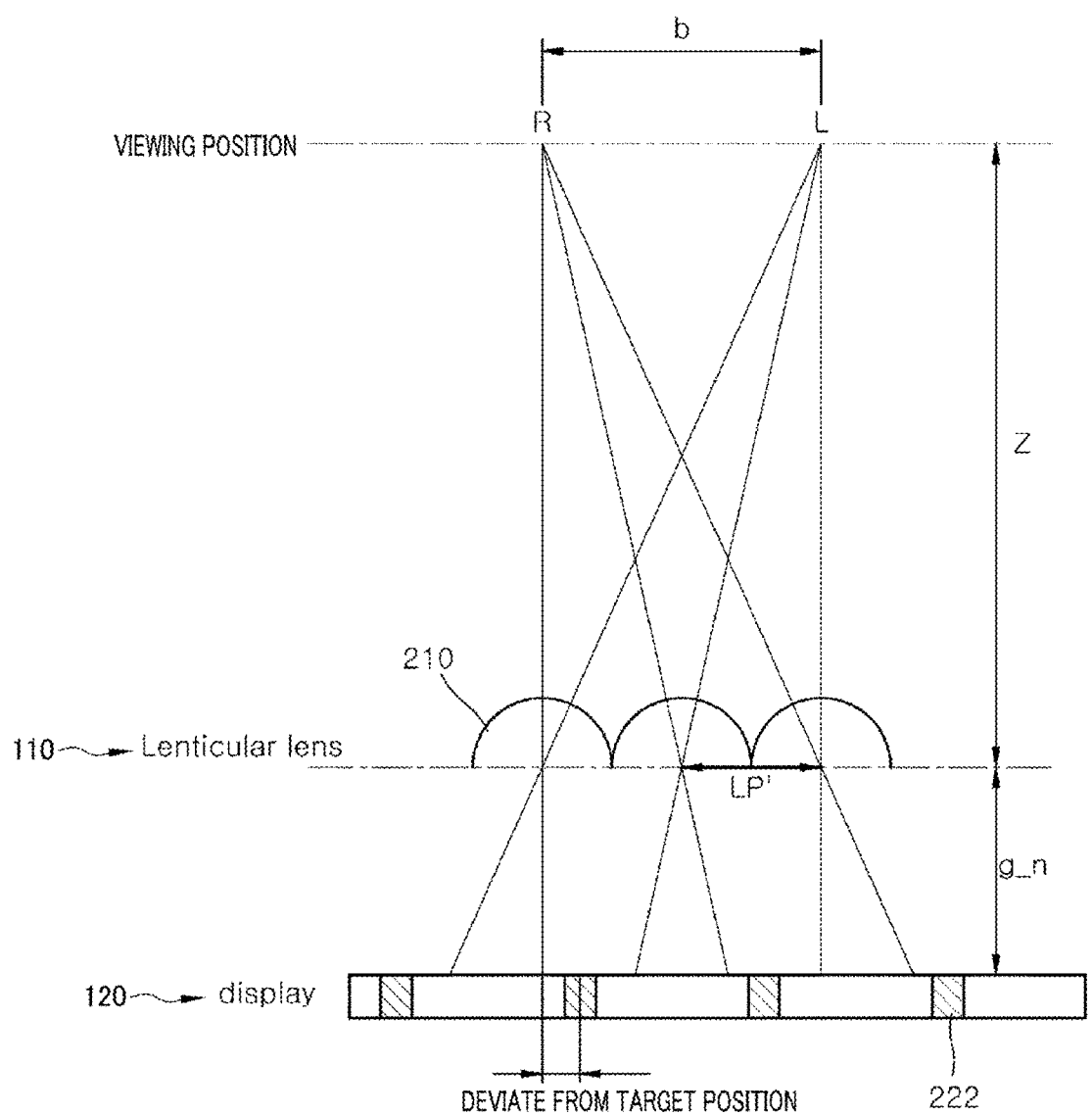

To this end, the processor 121 may turn on pixels of the display module 123 of the user device 120 to correspond to a space of the rendering pitch $P_2$, as shown in FIG. 15. In this case, the viewer can check whether the turned-on pixels are seen while keeping his/her one eye on the screen of the user device 120. If the turned-on pixels deviate from a target position as shown in FIG. 16, the viewer cannot see the turned-on pixels. In the present exemplary embodiment, the turned-on pixels are assumed as the first mapping pattern 222 corresponding to the right eye R of the viewer. For reference, the first mapping pattern 222 may include one or more pixels, or may include a half of a pixel. The second mapping pattern 224 may include pixels in the same manner as the first mapping pattern 222.

Figure 17:
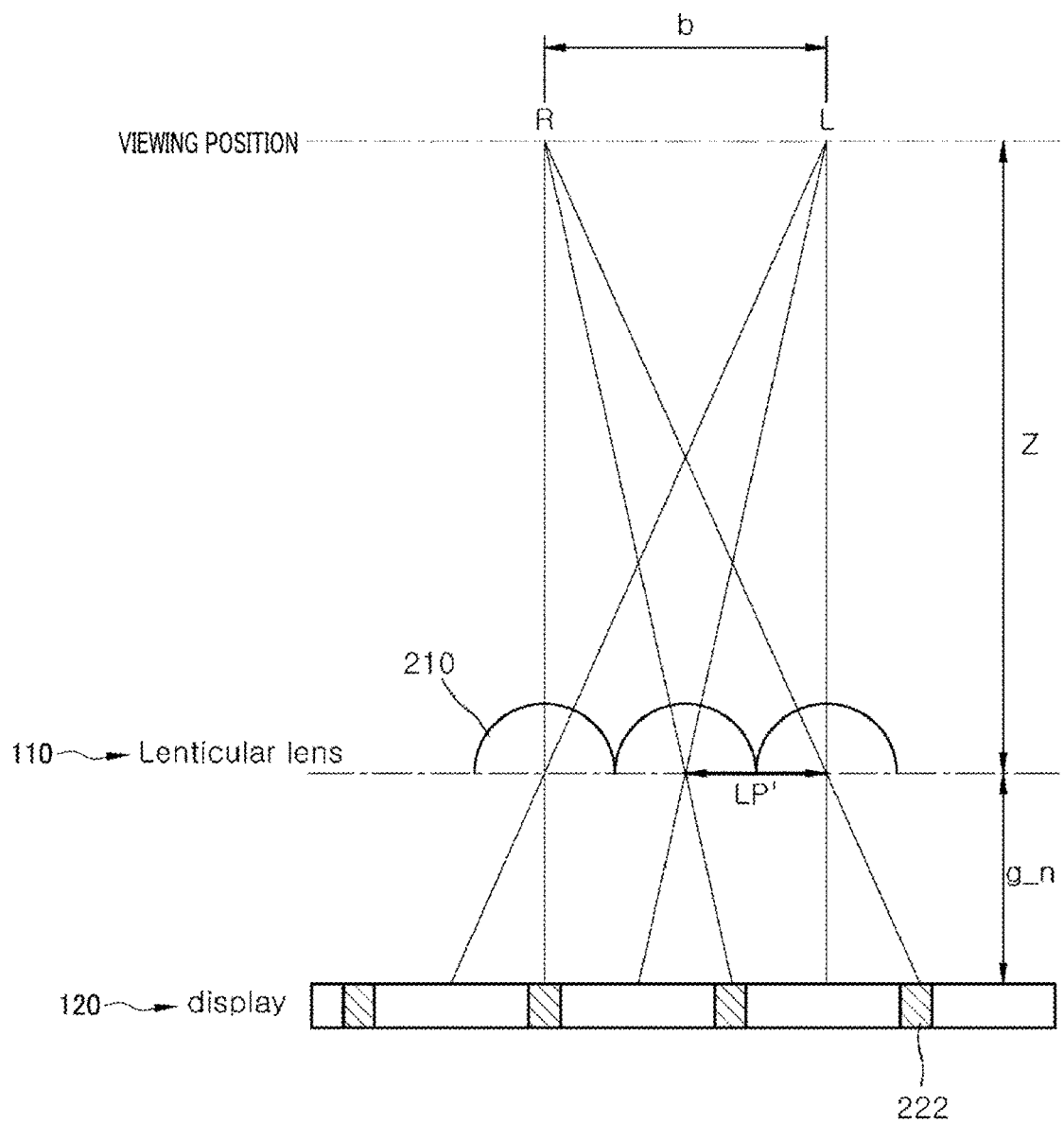

If the viewer cannot recognize the turned-on pixel as such, the processor 121 may change mapping values for positions of the turned-on pixels to move the positions of the pixels to the left as illustrated in FIG. 17 and thus correct misalignment between the position of the lenticular lens 210 at the time of being attached to the lens sheet and ON/OFF positions of the display module 123 of the user device 120. In this case, the processor 121 may move the ON/OFF positions of the display module 123 of the user device 120 to the right unlike the illustration in FIG. 17.

That is, the processor 121 may change mapping values for ON/OFF positions of the display module 123 of the user device 120 on the basis of whether or not the viewer can recognize the turned-on pixels to move the ON/OFF positions of the display module 123 of the user device 120 to the left or to the right, so that the processor 121 may mutually adjust the position of the lenticular lens 210 and the ON/OFF positions of the display module 123 of the user device 120. In this case, if an initially turned-on pixel cannot be recognized with the viewer's one eye, the processor 121 may repeatedly move the ON/OFF positions of the display device 123 of the user device 120 until a subsequently turned-on pixel can be recognized with the viewer's one eye.

Hereinafter, the method of moving the ON/OFF positions of the display module 123 of the user device 120 will be described in more detail with reference to FIG. 18 and FIG. 19.

Figure 18:
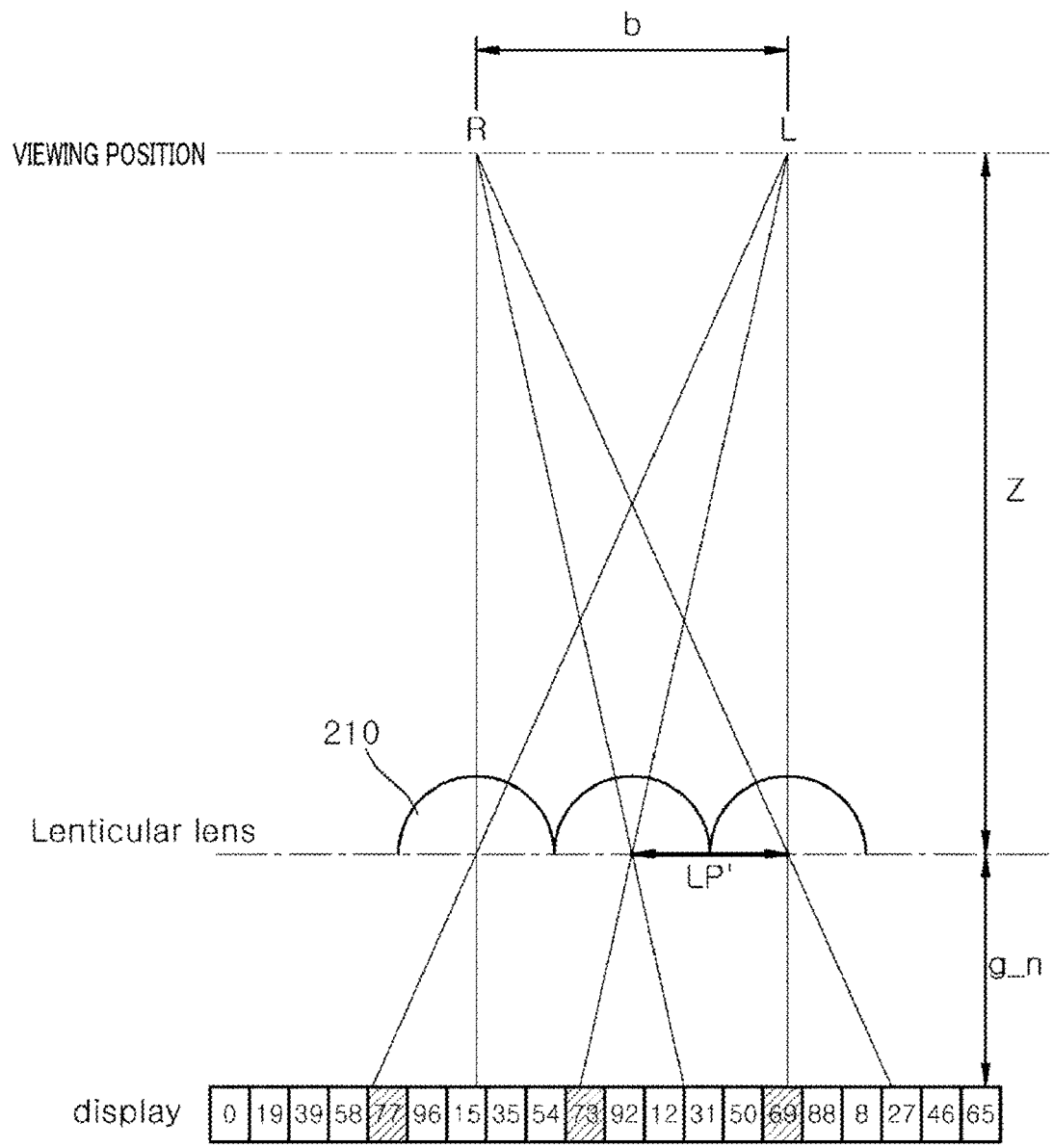

The processor 121 may number each pixel within a space of the rendering pitch $P_2$ in order to assign mapping values for ON/OFF positions of the display module 123 of the user device 120 as illustrated in FIG. 18, and set a number of a pixel to be turned on from among the pixels within the space of the rendering pitch $P_2$ on the basis of a difference between a number of a pixel corresponding to the viewer's left eye and a number of a pixel corresponding to the viewer's right eye. In this case, the processor 121 may turn on pixels within a predetermined range with reference to the set number of the pixel.

Herein, the rendering pitch $P_2$ may not be an integer multiple of a pixel size of the display module 123 of the user device 120. In this case, the processor 121 may divide the space of the rendering pitch $P_2$ into N (N is a natural number) number of equal parts and number each pixel within the space of the rendering pitch $P_2$ using the number of equal parts corresponding to one pixel from among the N number of parts. In this case, the processor 121 may calculate the remainder by dividing a number assigned to each pixel by N and then change the number assigned to each pixel using the calculated remainder.

For example, if 5.2 pixels are included in the rendering pitch $P_2$, it is difficult to determine which pixel needs to be turned on/off. In this case, the rendering pitch $P_2$ is divided into 100 equal parts, and if the number of equal parts corresponding to one pixel is H, H is 100/P2. If P2 is 5.2, H is 19.23. According to this, every pixel can be numbered as follows.

0 19 39 58 77 96 115 135 154 173 192 212 231 250 . . . .

Herein, numbering is repeated every 100 units. Thus, the remainders may be obtained by dividing by 100 as follows.

0 19 39 58 77 96 15 35 54 73 92 12 31 50 . . . .

If the number of pixels set for the left eye and the number of pixels for the right eye are determined as 25 and 75, respectively, with a difference of 50, only a pixel having a number identical to 25 or 75 needs to be turned on. The identical number may be set as a range. Thus, since H is 19.25, the range may be from 15 to 35 or from 65 to 85. The range may vary depending on a structure of a pixel or a value of H.

In this case, only pixels in the range of from 65 to 85 can be turned on and o means on).

0(x) 19(x) 39(x) 58(x) 77(o) 96(x) 15(x) 35(x) 54(x) 73(o) 92(x) 12(x) 31(x) 50(x) 69(o) 88(x) 8(x) 27(x) 46(x) 65(o) 85(o) 4(x) 23(x) 42(x) 62(x) 81(o) 0(x) 19(x) 39(x) 58(x) . . . .

Figure 19:
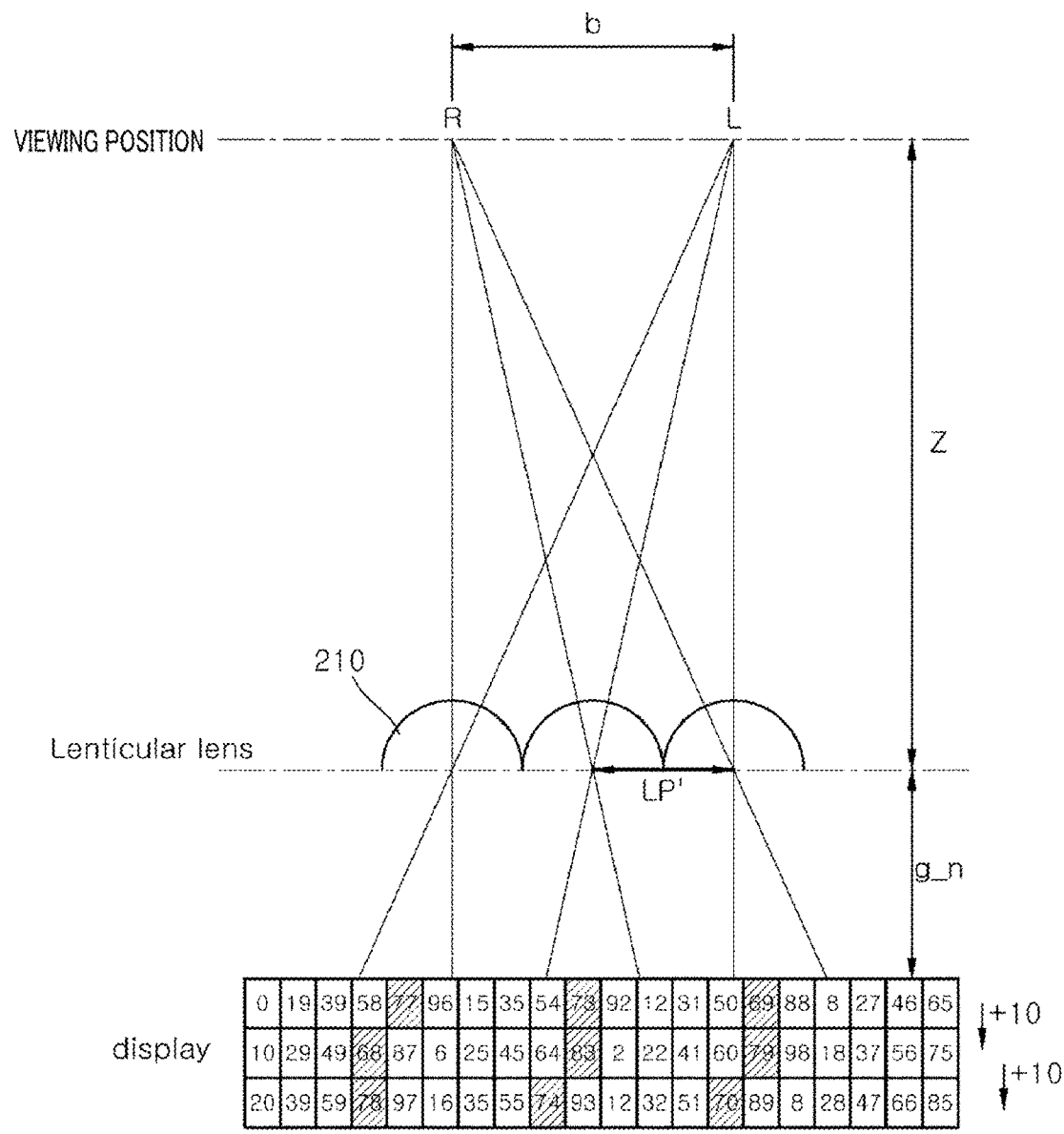
FIG. 19 is a diagram provided to explain a method of guiding an optimal viewing range in accordance with an exemplary embodiment of the present disclosure.

When the pixels placed within a predetermined range are turned on, if the viewer cannot recognize the pixels placed within the predetermined range with the viewer's one eye, the processor increases a number of each pixel within the space of the rendering pitch $P_2$ to move the ON/OFF positions of the display module 123 of the user device 120 to the left, as illustrated in FIG. 19. Otherwise, the processor 121 may reduce a number of each pixel within the space of the rendering pitch $P_2$ to move the ON/OFF positions of the display module 123 of the user device 120 to the right.

For example, as illustrated in FIG. 19, when numbering starts from 0 and pixels corresponding to numbers in the range of from 65 to 85 is turned on, pixels 58, 54, and 50 are present at positions corresponding to the left eye. Thus, the viewer cannot see the pixels from 65 to 68 with the left eye. An offset adjustment refers to a process of placing the pixels in the range of from 65 to 85 to be seen well with the left eye.

To this end, a number of an initial pixel is increased by 10. If so, pixels 68, 64, and 60 are placed at positions corresponding to the viewer's left eye, and, thus, the viewer can see the pixel 68 with the left eye. However, the viewer still cannot see the pixels 64 and 60 with the left eye. Therefore, a number of an initial pixel is increased by 10 again. If so, pixels 78, 74, and 70 are placed at positions corresponding to the viewer's left eye, and, thus, the viewer can see all the pixels with the left eye.

As such, in an exemplary embodiment of the present disclosure, a number of an initial number is increased by 10, and if so, a turned-on pixel is gradually moved to the left. If this process is repeated, the viewer's left eye can be matched with the pixel at one moment. In accordance with an exemplary embodiment of the present disclosure, the viewer can adjust a position of the lens with a position of a pixel as long as he/she finds a moment at which the screen is seen bright with his/her left eye. Thus, it is easy to use with a high accuracy in position.

Meanwhile, in a state where the rendering pitch $P_2$ is adjusted, the processor 121 may calculate a first viewing distance (optimal viewing distance) Z indicating a distance at which the viewer can view the most vivid stereoscopic image through the user device 120, on the basis of the glabella width b, the lens pitch LP', and the optical distance gn indicating a distance between the lenticular lens 210 and the display module 123 of the user device 120.

Herein, the optical distance gn may be a value calculated (fixed) in consideration of a refractive index and a physical distance from the lenticular lens 210 and the display module 123 of the user device 120.

Then, the processor 121 may measure a second viewing distance indicating an actual distance from the user device 120 to the viewer viewing a stereoscopic image through the user device 120 using the camera of the user device 120. Then, the processor 121 may compare the measured second viewing distance with the first viewing distance Z.

Therefore, the processor 121 may provide the user device 120 with a guide signal to guide the viewer to adjust the second viewing distance of the viewer on the basis of a distance difference between the first viewing distance Z and the second viewing distance.

For example, if the second viewing distance is greater than the first viewing distance Z as a result of comparison between the first viewing distance Z and the second viewing distance, the processor 121 may provide the user device 120 with a guide signal to guide the viewer to get closer to the user device 120. In other words, as illustrated in FIG. 11, if an actual viewing distance is greater than an optimal viewing distance, the processor 121 may provide the user device 120 with a guide signal to guide the viewer's eyes to get closer to the user device 120. Therefore, the viewer can maintain accuracy in correction of misalignment between the position of the lenticular lens 210 and the ON/OFF positions of the display module 123 of the user device 120 by reducing the actual viewing distance.

As another example, if the second viewing distance is smaller than the first viewing distance Z as a result of comparison between the first viewing distance Z and the second viewing distance, the processor 121 may provide the user device 120 with a guide signal to guide the viewer to get farther from the user device 120. In other words, if an actual viewing distance is smaller than an optimal viewing distance, the processor 121 may provide the user device 120 with a guide signal to guide the viewer's eyes to get farther from the user device 120. Therefore, the viewer can maintain accuracy in correction of misalignment between the position of the lenticular lens 210 and the ON/OFF positions of the display module 123 of the user device 120 by increasing the actual viewing distance.

Figure 20A:
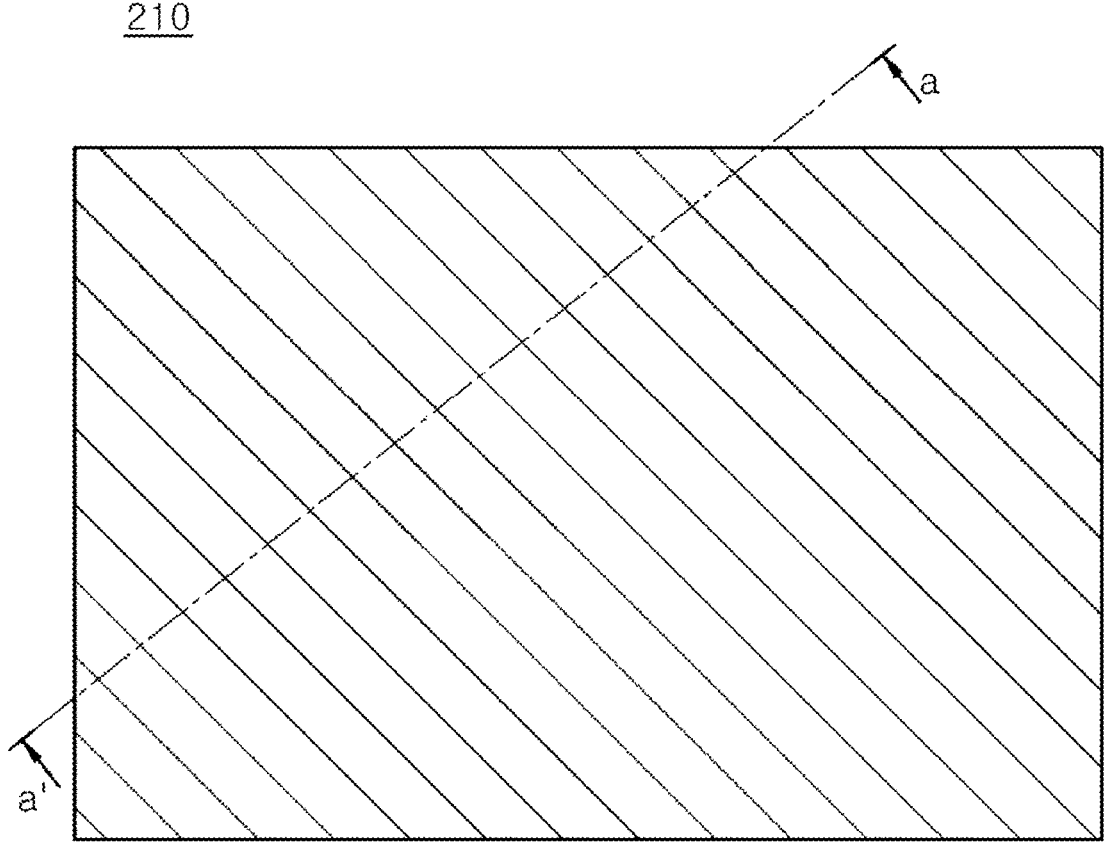
FIGS. 20A & 20B and FIG. 21 are diagrams provided to explain a method of adjusting a rendering angle of a screen caused by a slanted angle of a lens in accordance with an exemplary embodiment of the present disclosure.
Figure 20B:

Meanwhile, the lenticular lens 210 provided on the lens sheet may be arranged with a predetermined slanted angle to the lens sheet. In other words, the lens sheet includes a slanted pattern on its top surface due to arrangement of the lenticular lenses 210 with the slanted angle, as illustrated in FIGS. 20A & 20B.

Figure 21:
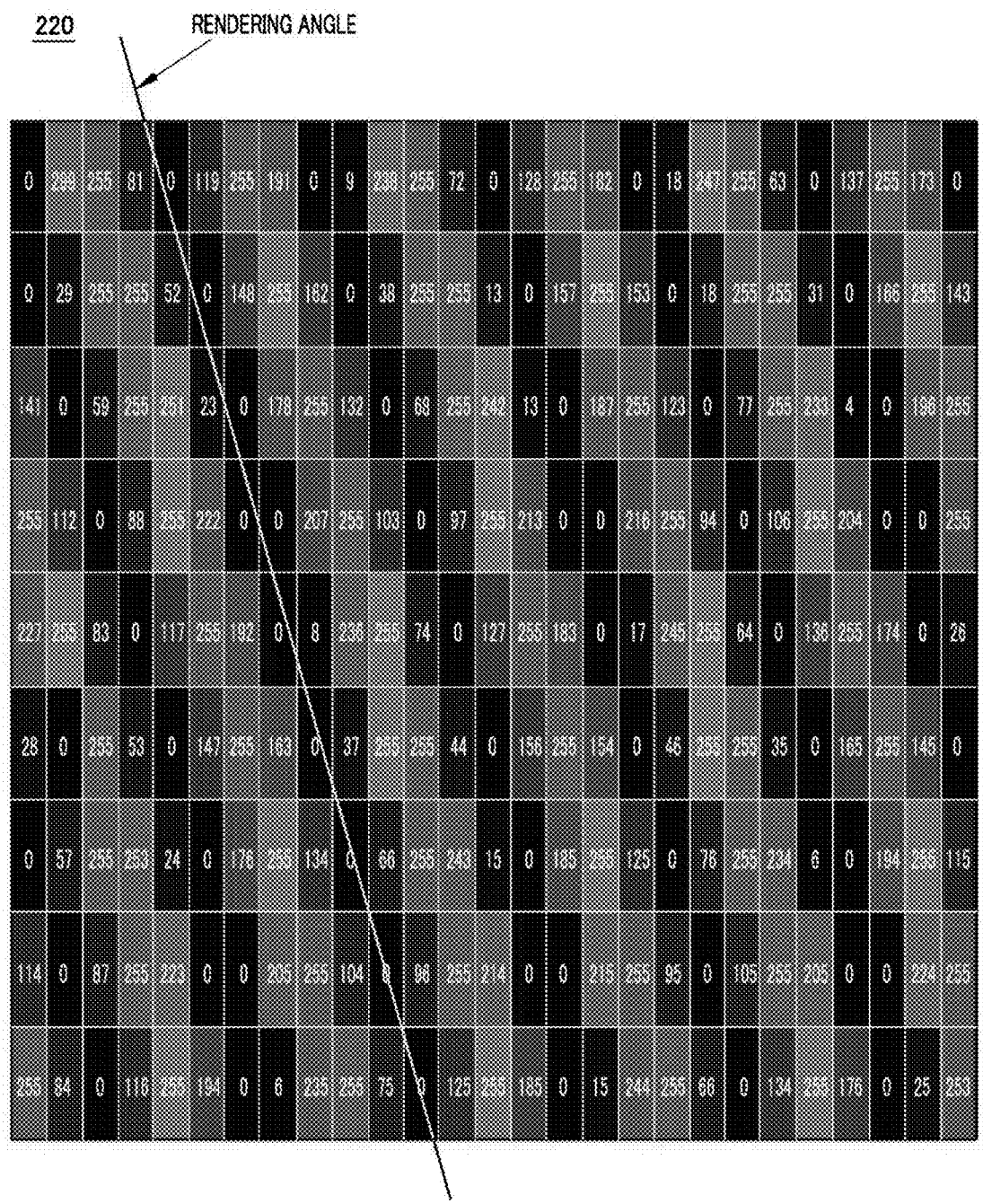

Therefore, the processor 121 may perform an operation for matching a rendering angle of the screen of the user device 120 with the slanted angle of the lenticular lenses 210, as illustrated in FIG. 21.

The display module 123 may display an offset control UI (User Interface) on the screen of the user device 120. Herein, the offset control UI may include a play button for increasing or reducing a number of each pixel at every predetermined time interval, a pause button for temporarily stopping an increase or reduction in a number of each pixel, a fine-tune button for fine-tuning a number of each pixel in a state where the pause button is selected, and an OK button for selecting when pixels within a predetermined range can be seen with the viewer's one eye.

For example, the viewer presses the play button on the screen of the user device 120. If so, a number of an initial pixel starting from 0 is automatically increased by 10. When the viewer finds a moment at which the screen is seen bright with his/her left eye, the viewer presses the pause button and changes a number of the initial value by −1 or +1 using the fine-tune button to find a position where the screen becomes brightest. When the viewer finds the position for the brightest screen, the viewer presses the OK button.

Figure 26:
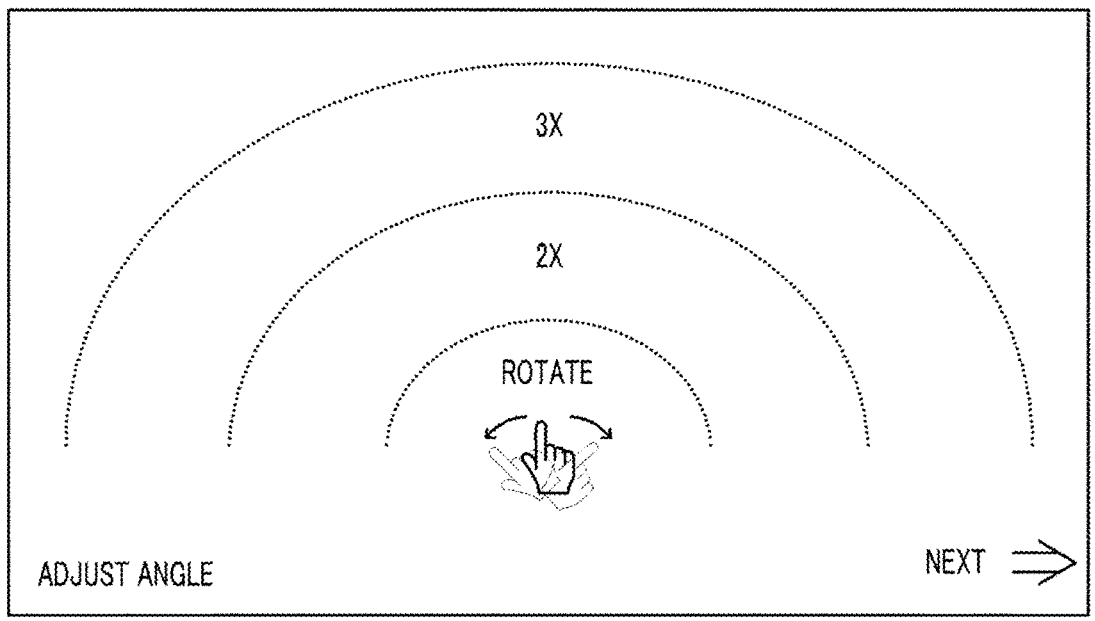
FIG. 26 illustrates an example of a UI for adjusting a viewing angle between a screen and a film.

In another exemplary embodiment, the display module 123 may provide a UI for adjusting a viewing angle between the screen and a film (i.e., lens sheet) as illustrated in FIG. 26. The UI may adjust a viewing angle between screen and the film by recognizing the user's gestures of drawing left and right half circles. For example, the right-side gesture may give a "+" value to increase the viewing angle, and the left-side gesture may give a "−" value to reduce the viewing angle. The UI may divide the screen into three stages in order to more readily adjust the viewing angle. A change is made at 1, 2, and 3 times speed in sequence from the bottom, and guide lines for the respective stages may be provided.

Figure 27:
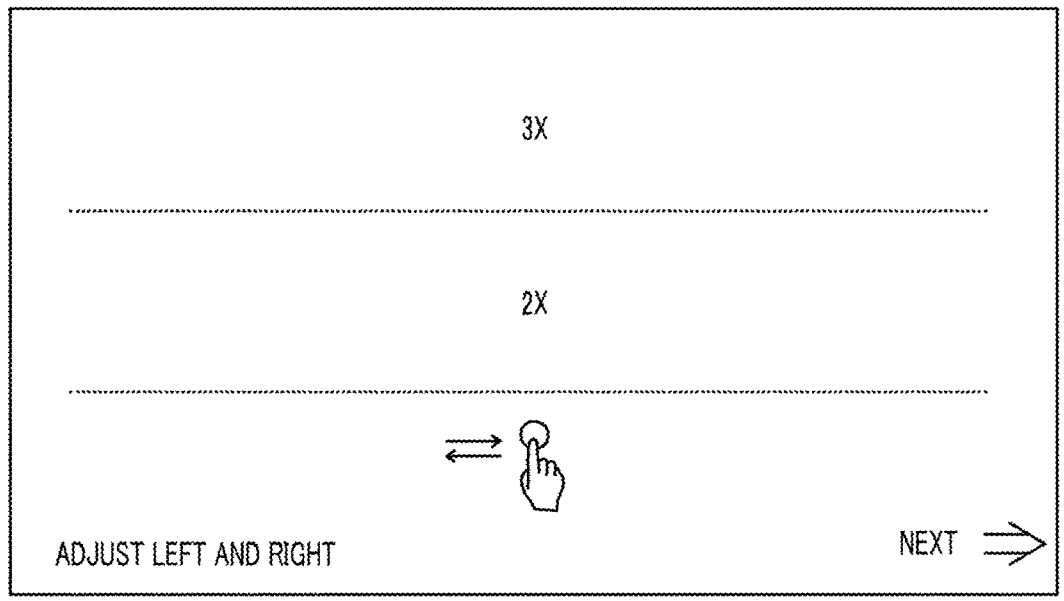
FIG. 27 illustrates an example of a UI for adjusting left and right values between a screen and a film.

In yet another exemplary embodiment, the display module 123 may provide a UI for adjusting left and right values between the screen and the film as illustrated in FIG. 27. The UI may adjust left and right values between the screen and the film by recognizing the user's gestures of left and right horizontal movements. For example, the right-side gesture may give a "+" value to move the screen to the right, and the left-side gesture may give a "−" value to move the screen to the left. The UI may divide the screen into three stages in order to more readily adjust the left and right values. A change is made at 1, 2, and 3 times speed in sequence from the bottom, and guide lines for the respective stages may be provided.

FIG. 22 through FIG. 25 are flowcharts provided to explain a method of correcting misalignment by a stereoscopic image display device in accordance with an exemplary embodiment of the present disclosure.

Figure 22:
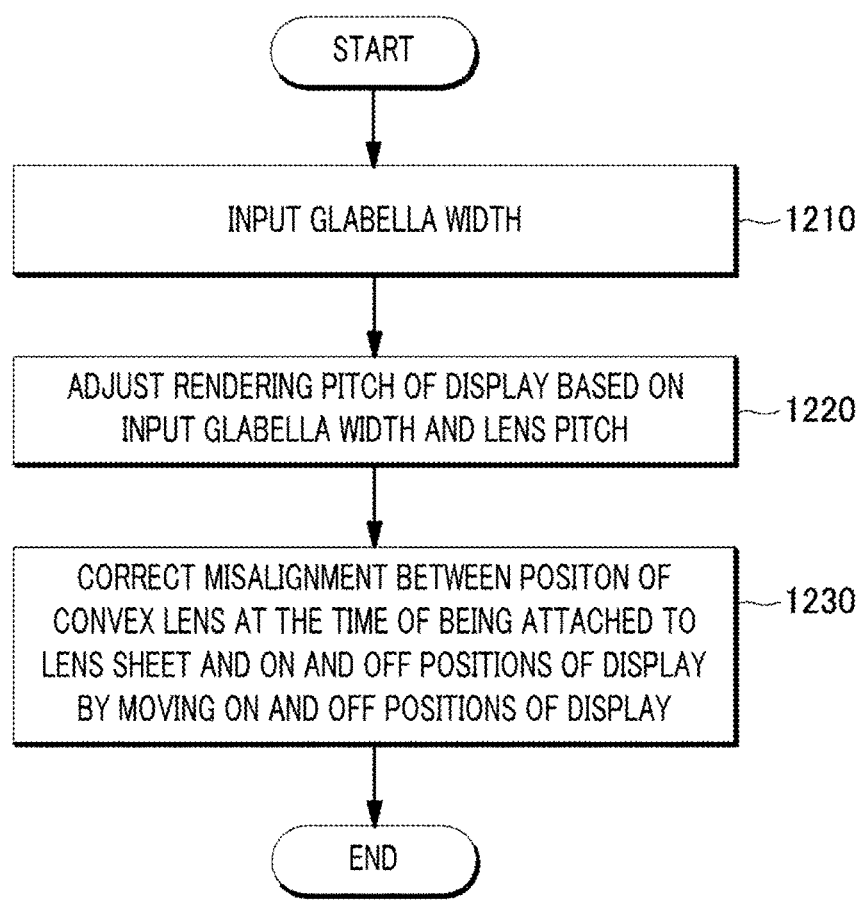
FIG. 22 through FIG. 25 are flowcharts provided to explain a method of correcting misalignment by a stereoscopic image display device in accordance with an exemplary embodiment of the present disclosure.
Figure 23:
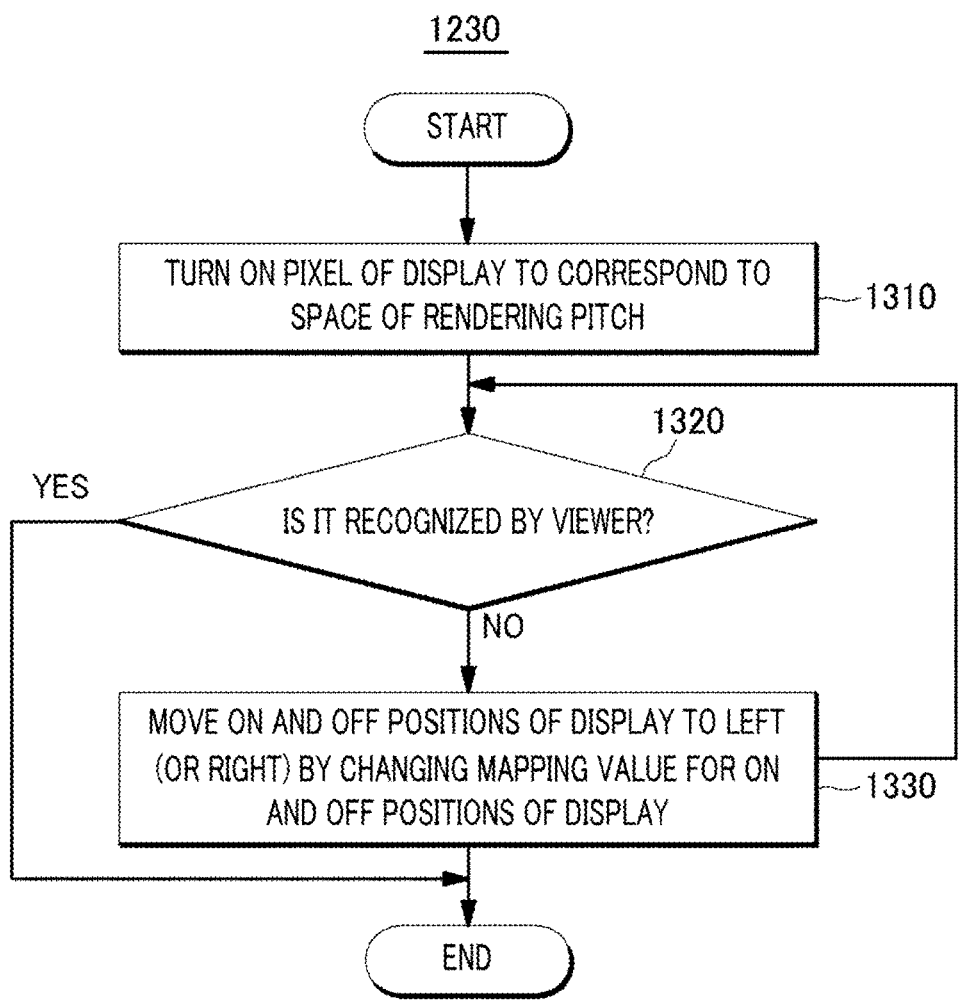
Figure 24:
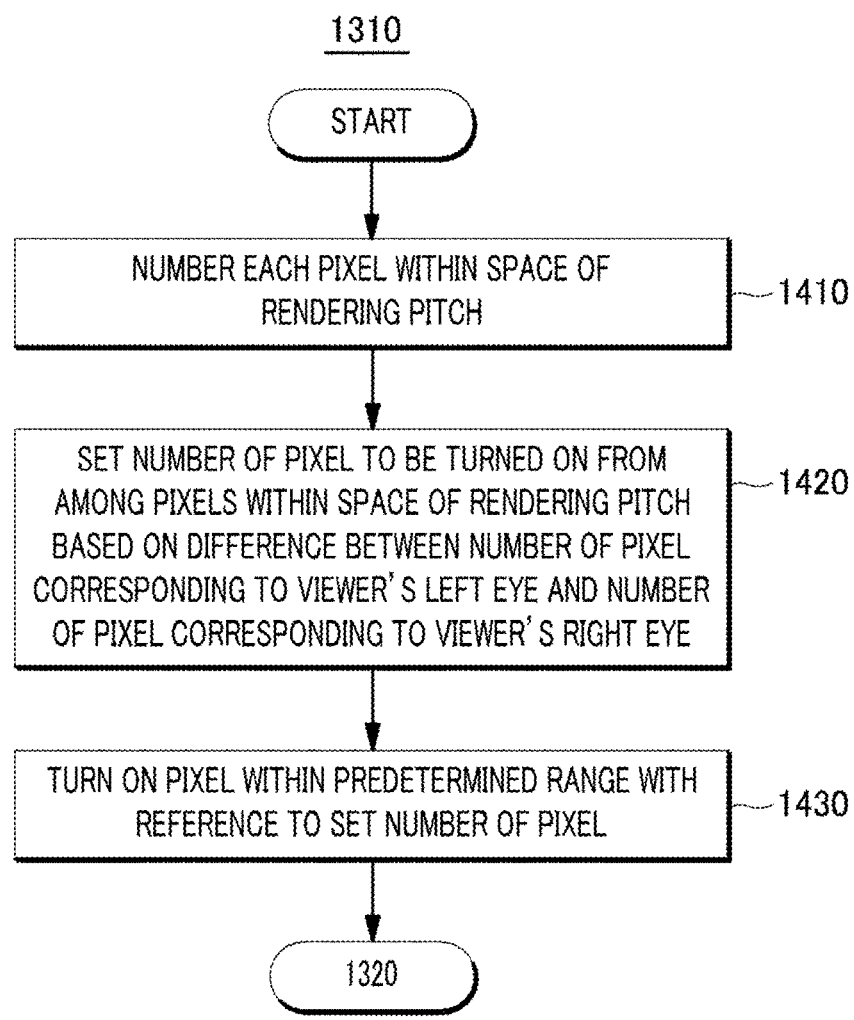

Referring to FIG. 22 through FIG. 24, the stereoscopic image display device receives a glabella width of the viewer in 1210.

Then, in 1220, the stereoscopic image display device adjusts a rendering pitch of a display of the user device 120 on the basis of the input glabella width and a lens pitch.

Then, in 1230, the stereoscopic image display device corrects misalignment between a position of the convex lens at the time of being attached to the lens sheet and ON/OFF positions of the display by moving the ON/OFF positions of the display.

To this end, in 1310, the stereoscopic image display device turns on pixels of the display to correspond to a space of the rendering pitch.

Specifically, in 1410, the stereoscopic image display device numbers each pixel within the space of the rendering pitch in order to assign mapping values for the ON/OFF positions of the display. Then, in 1420, the stereoscopic image display device sets a number of a pixel to be turned on from among the pixels within the space of the rendering pitch on the basis of a difference between a number of a pixel corresponding to the viewer's left eye and a number of a pixel corresponding to the viewer's right eye. Then, in 1430, the stereoscopic image display device turns on pixels within a predetermined range with reference to the set number of the pixel.

Then, in 1320, the stereoscopic image display device determines whether or not the viewer can recognize the turned-on pixels.

If it is determined that the viewer does not recognize the turned-on pixels ("NO" from 1320), the stereoscopic image display device changes mapping values for the ON/OFF positions of the display to move the ON/OFF positions of the display to the left (or to the right) in 1330. Meanwhile, if it is determined that the viewer recognizes the turned-on pixels ("YES" from 1320), the stereoscopic image display device ends the present exemplary embodiment.

Figure 25:
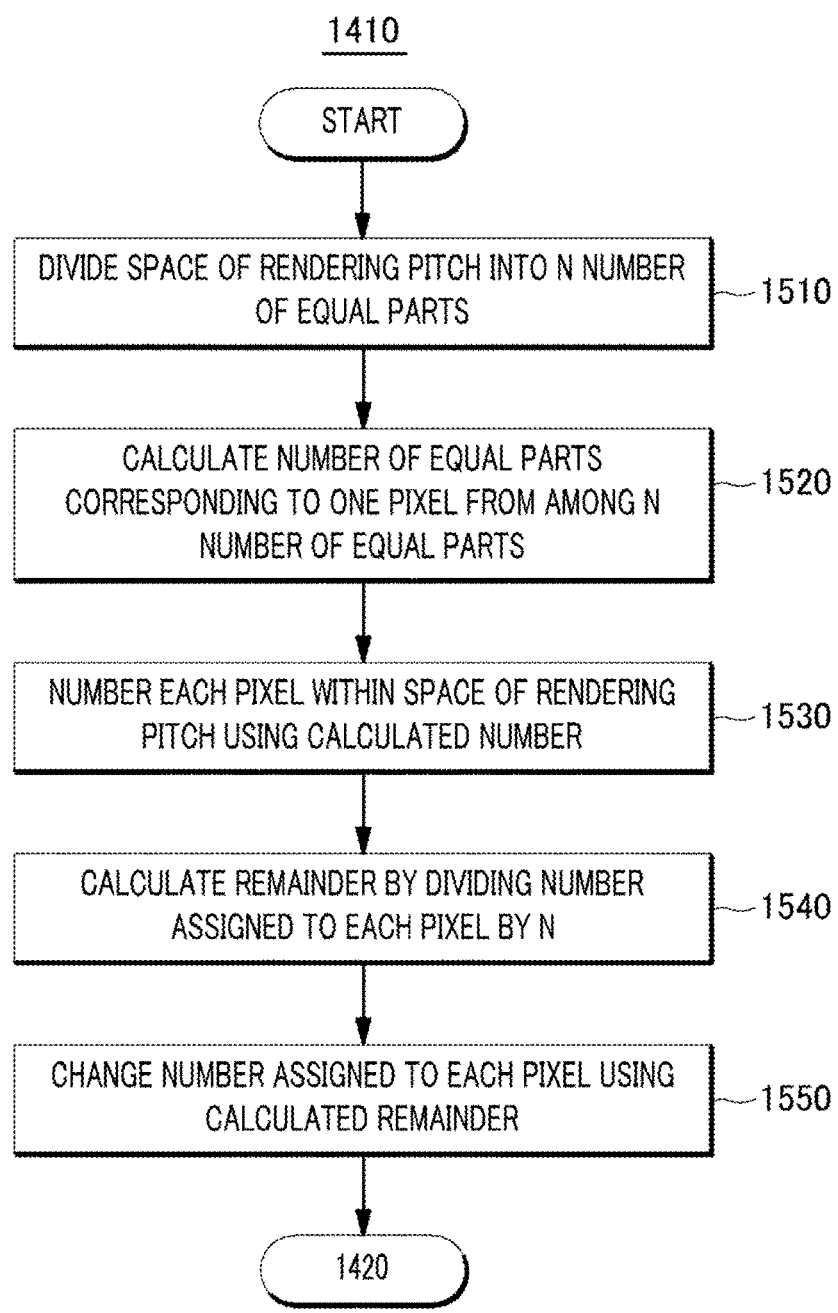

Hereinafter, a process of numbering each pixel within the space of the rendering pitch in case where the rendering pitch is not an integer multiple of a pixel size of the display will be described in detail with reference to FIG. 25.

Firstly, in 1510, the stereoscopic image display device divides the space of the rendering pitch into N (N is a natural number) number of equal parts. Then, in 1520, the stereoscopic image display device calculates a number H of equal parts corresponding to one pixel from among the N number of parts. Then, in 1530, the stereoscopic image display device numbers each pixel within the space of the rendering pitch using the calculated number H. Then, in 1540, the stereoscopic image display device calculates the remainder by dividing a number assigned to each pixel by N. Then, in 1550, the stereoscopic image display device changes the number assigned to each pixel using the calculated remainder.

Meanwhile, the stereoscopic image display device may perform an operation of correcting misalignment for each eye of the user as described above, or may perform an operation of correcting misalignment at a time when the user opens his/her two eyes.

The operation principle will be described below.

Figure 28A:
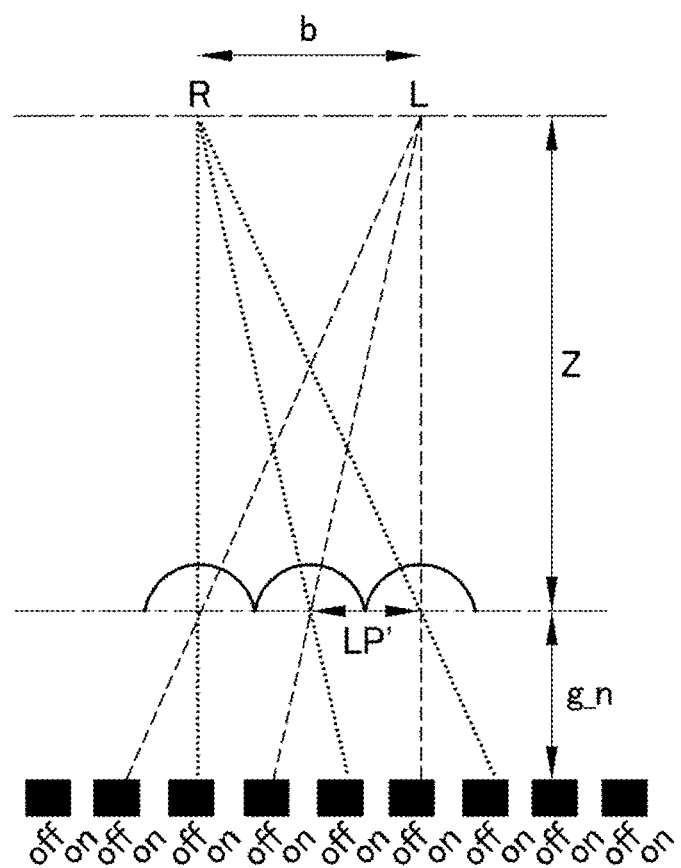
Figure 28B:
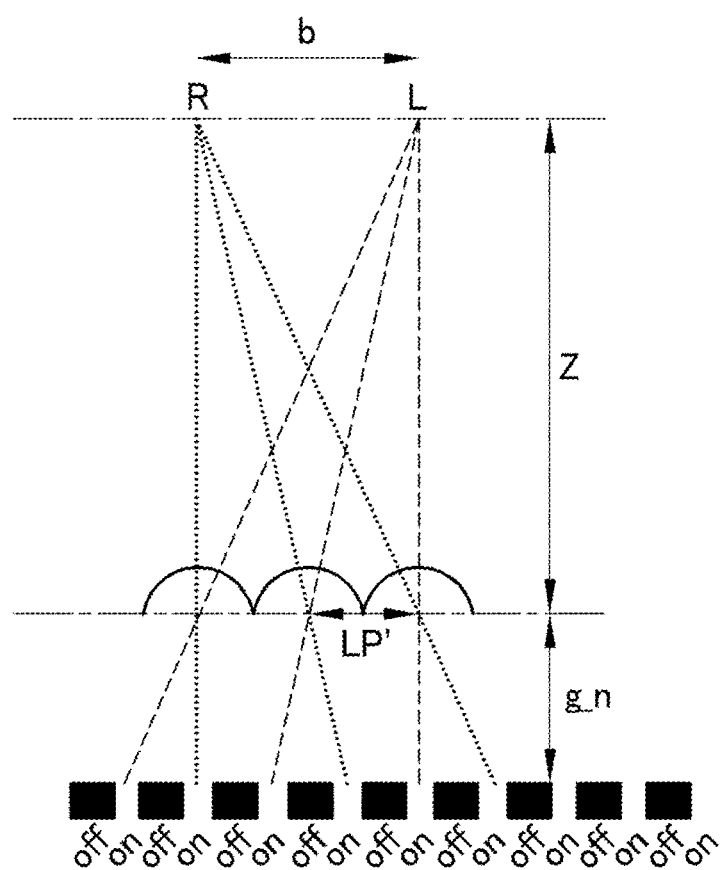

Referring to FIG. 28A, turned-off pixels are matched with the user's two eyes, and, thus, the screen of the user device is seen dark with the user's two eyes. However, as illustrated in FIG. 28B, if turned-on pixels are changed in position to be matched with the user's two eyes, the user can see the bright screen. In this case, a position of the lenticular lens may be calculated back using a relative position of the user to the user device and pixel information, so that correct alignment positions of the lens and the pixel can be found.

Herein, the important thing is that a width of turned-on pixels needs to be smaller than a width of turned-off pixels and only then can correct alignment positions be found.

Meanwhile, on the contrary to the above-described example, misalignment can be corrected by applying positions of turned-on/off pixels to find a position where the screen becomes darkest.

An operation of the user interface for correcting misalignment may be performed as follows.

That is, when the user sees the screen at a specific position with respect to the user device, positions of turned-on/off pixels are changed according to a predetermined rule, and during the change in position, the user may find a moment at which the screen becomes brightest or darkest. Thus, it is possible for the user to easily correct alignment at a time with the two eyes.

Specifically, relative positions of the user's two eyes and the user device are checked.

The processor of the user device may measure a distance between the user's two eyes and the screen of the user device using the camera. Otherwise, the processor may provide guide information to guide the user's two eyes to see the center of the screen to estimate a distance between the user's two eyes and the screen. For example, a target may be displayed at the center of the screen and positions of focuses of the user's two eyes for the screen are displayed on the screen, so that the user's two eyes may be induced to see the center of the screen by adjusting the target to the screen.

When the user sees the screen of the user device, the processor of the user device may provide information to move ON/OFF positions of pixels to the left or to the right of the screen through a button or a slider.

If the user inputs a signal to the left or to the right into the user device in response to this, positions of turned-on pixels and turned-off pixels on the display module are moved one by one according to a direction indicated by the signal. That is, the pixels are not actually moved but brightness values of the pixels at the respective positions are changed, so that the positions of the turned-on pixels and turned-off pixels are changed. From the user's point of view, the bright pixels may look as if actually moving to the left or to the right. Otherwise, if the user clicks the play button, a number of a pixel to be turned on may be automatically increased by one in a predetermined direction of the left direction or the right direction.

Figure 28C:
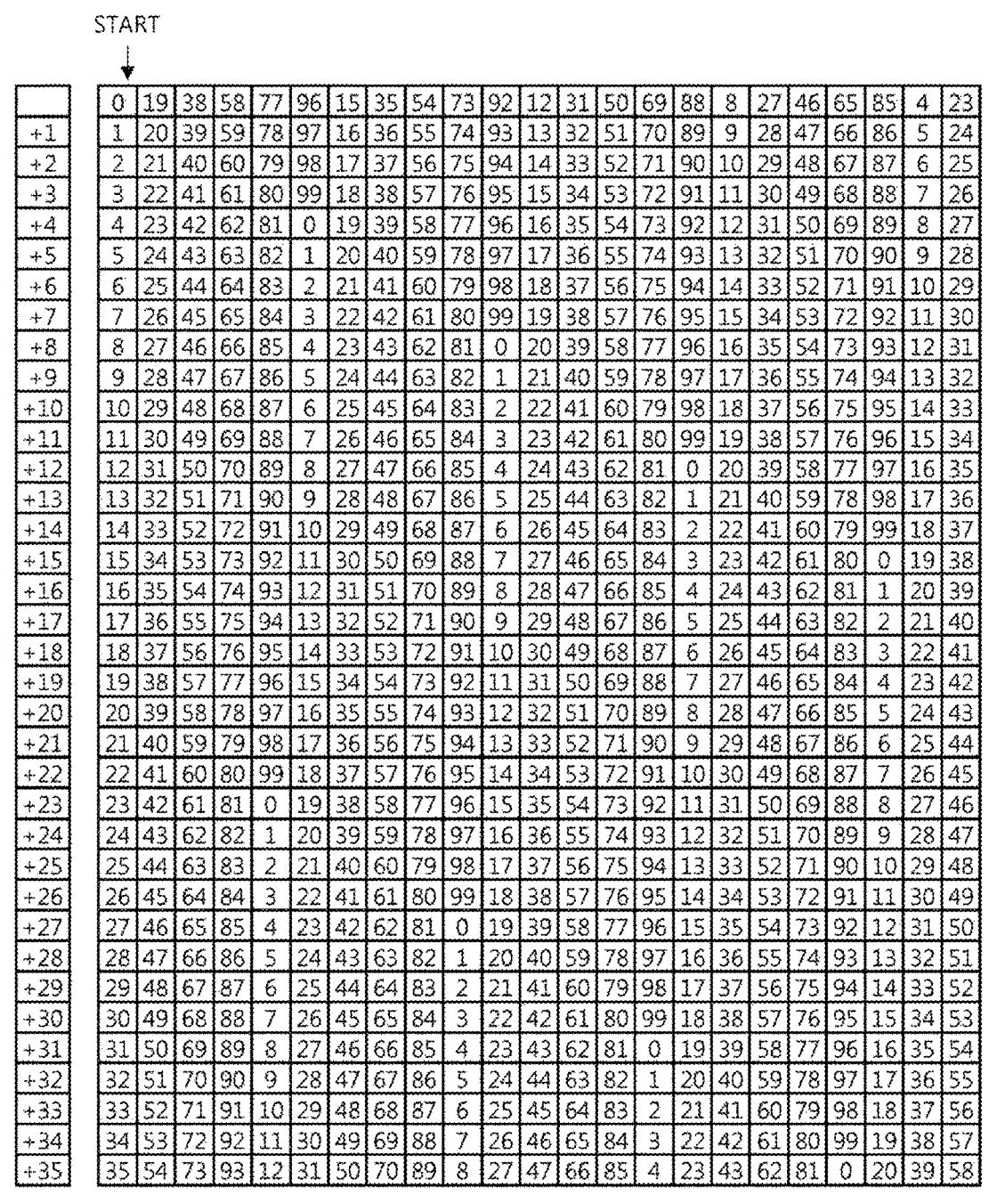

Herein, on the screen including pixels configured as shown in FIG. 28C, a pixel to be turned on starts from 0 and then automatically moves to a pixel 1 and a pixel 2 in sequence, so that a number of a pixel may be added by one.

Then, the user may input a stop signal to stop the movement of the turned-on/off pixels at a position where the screen is darkest or brightest. The stop signal may be a behavior of taking the user's body part off the pause button, the stop button, or the screen.

Meanwhile, it is difficult for the user to exactly catch the brightest or darkest moment while the positions of the turned-on/off pixels are changed. Thus, an interface that enables the user to perform fine-tuning may be provided. For example, a left-side fine-tune button to give a command to move a position value of a turned-on/off pixel to the left by one and a right-side fine-tune button to give a command to move a position value of a turned-on/off pixel to the right may be respectively arranged on the left and the right of the pause button or the stop button. Therefore, when the user recognizes that the screen becomes bright, the user inputs the stop signal and finds a position where the screen becomes brightest while pressing the right-side fine-tune button or the left-side fine-tune button. When the user finds the position for the brightest screen, the user clicks the "OK" button and thus can complete the process of correcting misalignment.

Figure 29:
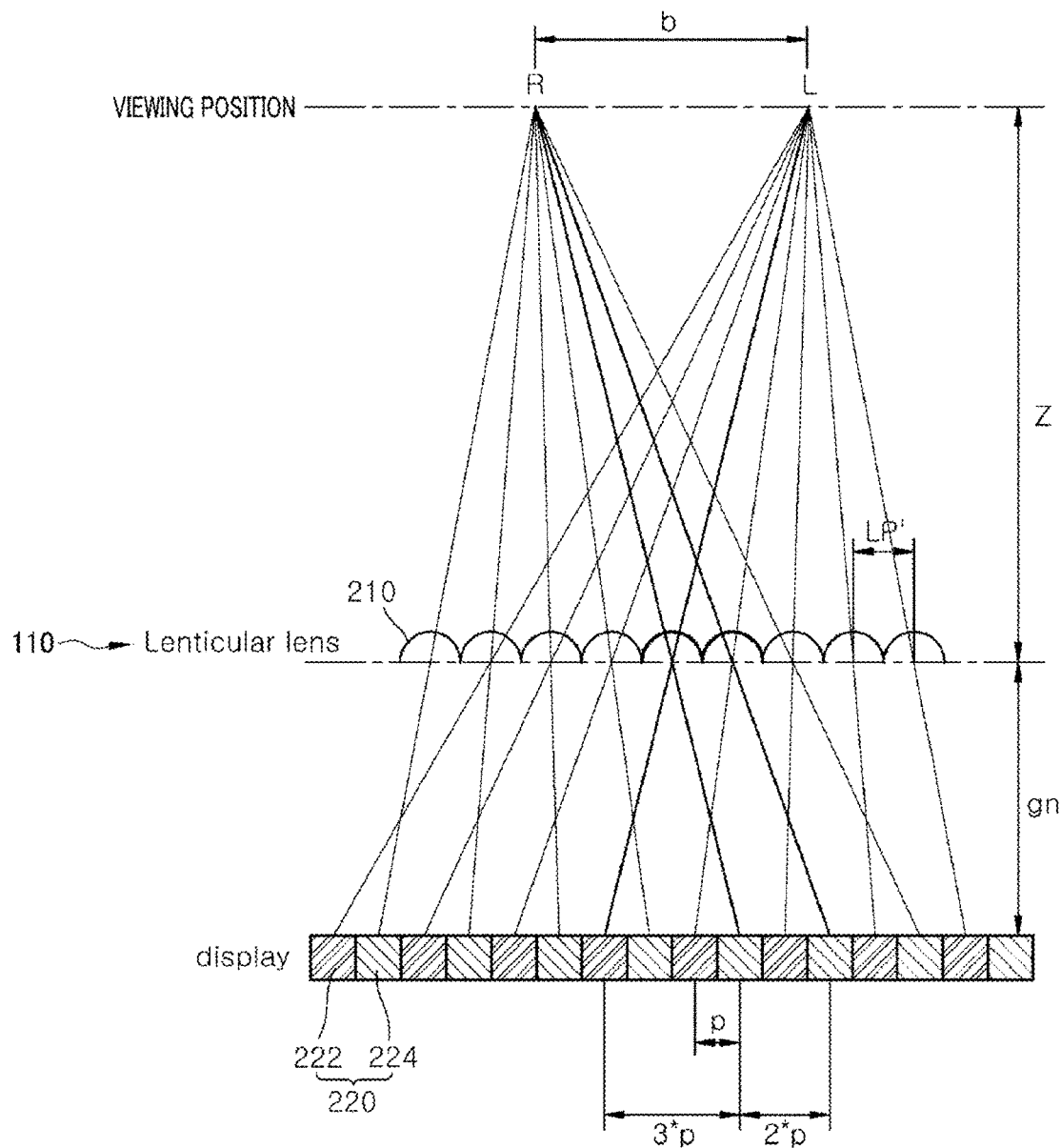
FIG. 29 is a conceptual diagram provided to explain a method of improving resolution while maintaining a viewing distance in accordance with an exemplary embodiment of the present disclosure.

Hereinafter, a method of improving resolution of the stereoscopic image display device 100 under the same conditions in terms of a glabella width b, a viewing distance b, and an optical distance gn will be described with reference to FIG. 29.

The processor 121 may reduce the rendering pitch $P_2$ on the basis of the glabella width b, the viewing distance b, and the optical distance gn. Herein, the processor 121 may reduce the distance $P_1$ between adjacent first and second mapping patterns 222 and 224 by an odd number multiple (e.g., 3 times) to adjust a first rendering pitch calculated on the basis of a glabella width and a lens pitch to a second rendering pitch calculated on the basis of a glabella width, a viewing distance, and an optical distance. Thus, the density between the adjacent first and second mapping patterns 222 and 224 can be increased and the resolution can be improved.

Meanwhile, the processor 121 may calculate the lens pitch LP' on the basis of the second rendering pitch and the glabella width such that the right eye R and the left eye L respectively correspond to non-adjacent first and second mapping patterns from among the multiple first and second mapping patterns 222 and 224 through the same lenticular lens 210. That is, the lens pitch is designed such that a right-eye image and a left-eye image provided to the user through each lenticular lens 210 are caused by non-adjacent mapping patterns 222 and 224 within the display module 123. Further, the processor 121 may provide information about the calculated lens pitch LP' to the display module 123. The display module 123 may display the information about the lens pitch LP' on the screen of the user device 120. Thus, the user may check the information about the lens pitch LP' and attach the lens sheet 110b to the user device 120 to be suitable for the lens pitch LP'. Therefore, the user can view a higher-resolution stereoscopic image while maintaining the viewing distance.

Figure 30:
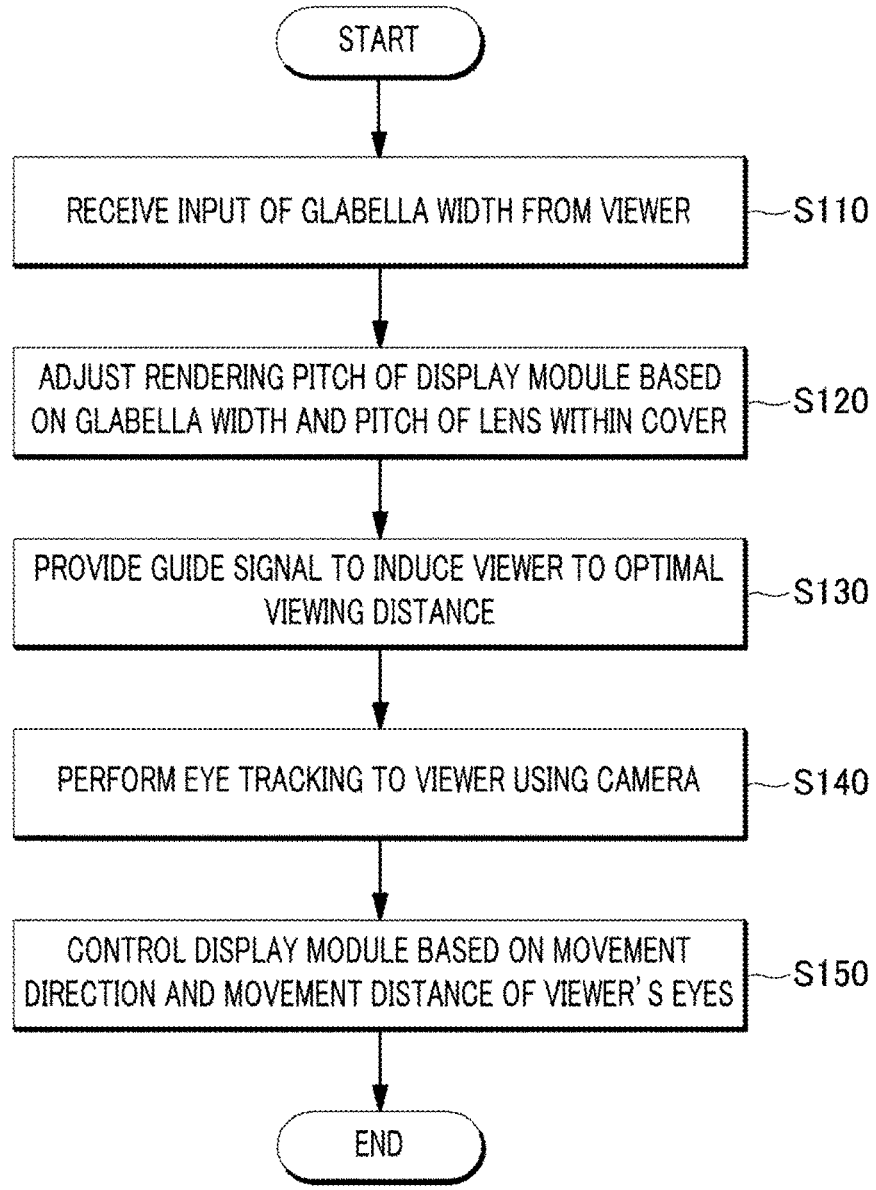
FIG. 30 is a flowchart provided to explain a glass-free stereoscopic image display method in accordance with an exemplary embodiment of the present disclosure.

Hereinafter, a glass-free stereoscopic image display method in accordance with an exemplary embodiment of the present disclosure will be described in detail with reference to FIG. 30.

The following method is performed by the above-described glass-free stereoscopic image display device 100. Thus, any omitted parts will be substituted with the above descriptions.

Firstly, the user may access to the content providing server by executing a program (or application) installed in the user device of the stereoscopic image display device 100. The content providing server includes multiple glass-free stereoscopic image contents and provides a service of playing a desired stereoscopic image content as selected by the user.

The user may select any one stereoscopic image content and make an input to play the stereoscopic image content using the program.

In this case, the stereoscopic image display device 100 receives an input of a glabella width from the user (S110). The input of the glabella width can be performed by previously providing specific options for a face size and providing a user interface that enables the user to select any one option.

Then, the stereoscopic image display device 100 adjusts a rendering pitch of the display module 123 on the basis of the glabella width and a lens pitch between the lenticular lenses 210 within the cover 110 (S120).

The stereoscopic image display device 100 calculates an optimal viewing distance on the basis of the rendering pitch and provides a guide signal to guide the user to the optimal viewing distance (S130). Herein, the stereoscopic image display device 100 calculates a first viewing distance indicating a distance at which the user can view the most vivid image, on the basis of the glabella width, the lens pitch, and an optical distance indicating a distance between the lenticular lens 210 and the display and measures a second viewing distance, which is an actual viewing distance, using the camera 122 of the user device 120. Further, the stereoscopic image display device 100 provides the user device 120 with a guide signal to guide the user to adjust the second viewing distance of the user on the basis of a distance difference between the first viewing distance and the second viewing distance.

Then, the stereoscopic image display device 100 performs eye tracking about the user's eyes using the camera 122 to acquire a movement direction and a movement distance of the user's eyes (S140). It is possible to know whether positions of the user's eyes are moved by eye tracking.

The stereoscopic image display device 100 controls the display module 123 on the basis of the movement distance and the glabella width. Thus, even if the user makes a movement, the stereoscopic image display device 100 can actively provide a stereoscopic image to the user (S150). Specifically, an offset value is calculated and light-emitting patterns (i.e., multiple first and second mapping patterns) of the pixels 220 in the display module 123 are moved by the offset value in the opposite direction of the measured movement direction, so that the stereoscopic image display device 100 can actively provide a stereoscopic image suitable for the moved user.

The embodiment of the present disclosure can be embodied in a storage medium including instruction codes executable by a computer such as a program module executed by the computer. Besides, the data structure in accordance with the embodiment of the present disclosure can be stored in the storage medium executable by the computer. A computer-readable medium can be any usable medium which can be accessed by the computer and includes all volatile/non-volatile and removable/non-removable media. Further, the computer-readable medium may include all computer storage. The computer storage medium includes all volatile/non-volatile and removable/non-removable media embodied by a certain method or technology for storing information such as computer-readable instruction code, a data structure, a program module or other data.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A glass-free stereoscopic image display device comprising:
a display module that displays a stereoscopic image through a cover including a lenticular lens including multiple convex lenses; and
a processor that controls the display module,
wherein the processor adjusts a rendering pitch of the display module on the basis of a viewing position of an user and a lens pitch indicating a distance between the multiple convex lenses, and provides a stereoscopic image by controlling a left-eye image pixel and a right-eye image pixel of the display module on the basis of the lens pitch,
the rendering pitch indicates a distance between left-eye image pixels of the display module or a distance between right-eye image pixels of the display module, the viewing position refers to a position where a right eye and a left eye of the user are placed, and
the cover is provided on a front surface of the user device to be combined with the user device.

2. A glass-free stereoscopic image display method performed by a processor of a user device, comprising:
providing a stereoscopic image by controlling a left-eye image pixel and a right-eye image pixel of a display module of the user device,
wherein the providing of a stereoscopic image comprises adjusting a rendering pitch of the display module on the basis of a viewing position of a user and a lens pitch, and
controlling the display module on the basis of the rendering pitch so that an image displayed on the display module is converted into a stereoscopic image through a cover, which is provided on a front surface of the user device and including a lenticular lens, and then provided to a user,
the rendering pitch indicates a distance between left-eye image pixels of the display module or a distance between right-eye image pixels of the display module,
the lens pitch indicates a distance between multiple convex lenses included in the lenticular lens,
the viewing position refers to a position where a right eye and a left eye of the user are placed.

3. The glass-free stereoscopic image display method of claim 2, further comprising:
before the providing of a stereoscopic image,
receiving a list of multiple glass-free stereoscopic image contents from a content providing server by executing an application installed in the user device, providing the list to the user, and receiving an input to display any one stereoscopic image content as selected by the user.

4. The glass-free stereoscopic image display method of claim 2,
wherein the providing of a stereoscopic image includes:
calculating a distance between first and second mapping patterns adjacent to each other from among multiple first mapping patterns corresponding to the left-eye image pixel and multiple second mapping patterns corresponding to the right-eye image pixel on the basis of the lens pitch and the viewing position of the user; and
adjusting the rendering pitch indicating a distance between the multiple first mapping patterns and a distance between the multiple second mapping patterns on the basis of the calculated distance.

5. The glass-free stereoscopic image display method of claim 2,
wherein the providing of a stereoscopic image further includes:
calculating a first viewing distance indicating a distance at which the user views an image with a sharper image quality than a predetermined level on the basis of the viewing position of the user, the lens pitch, and an optical distance indicating a distance from the lenticular lens to the left-eye image pixel and the right-eye image pixel;
measuring a second viewing distance indicating an actual viewing distance from the user device to the user using a camera connected to the user device; and
providing a guide signal to guide the user to adjust the second viewing distance of the user on the basis of a distance difference between the first viewing distance and the second viewing distance through the display module.

6. The glass-free stereoscopic image display method of claim 2,
wherein the adjusting of a rendering pitch includes:
measuring the viewing position of the user from the user device to the user using a camera connected to the user device; and
adjusting the rendering pitch of the display module on the basis of the viewing position and the lens pitch.

7. The glass-free stereoscopic image display method of claim 4,
wherein the providing of a stereoscopic image includes:
measuring a movement direction and a movement distance of the user's eyes by performing eye tracking about the user's eyes using a camera connected to the user device;
calculating an offset value to be applied to the display module on the basis of the measured movement distance; and
controlling the display module to move the multiple first and second mapping patterns by the offset value.

8. The glass-free stereoscopic image display method of claim 2, further comprising:
before the providing of a stereoscopic image,
correcting misalignment between the lenticular lens including the multiple convex lenses and the left-eye and right-eye image pixels of the display module by moving ON and OFF positions of the pixels included in the display module.

9. The glass-free stereoscopic image display method of claim 8,
wherein the correcting of misalignment includes:
moving the ON and OFF positions of the pixels of the display module to the left or to the right by turning on pixels in an area of the display module to correspond to a space of the rendering pitch and changing mapping values for the ON and OFF positions of the pixels of the display module on the basis of whether the user recognizes the turned-on pixels.

10. The glass-free stereoscopic image display method of claim 9,
wherein the moving of the ON and OFF positions of the pixels of the display module to the left or to the right is performed until the turned-on pixels are recognized with the user's one eye or two eyes.

11. The glass-free stereoscopic image display method of claim 8,
wherein in the correcting of misalignment,
the ON and OFF positions of the pixels of the display module are moved in sequence to pixels on the left or right of initially predetermined positions and an input signal about a moment at which a screen of the display module becomes brightest or darkest is received from the user to determine alignment positions between the lenticular lens and the left-eye and right-eye image pixels.

12. The glass-free stereoscopic image display method of claim 11,
wherein the correcting of misalignment includes:
specifying a distance between the user's two eyes and the screen of the user device using a camera of the user device or a predetermined reference value;
moving the ON and OFF positions of the pixels of the display module of the user device in sequence to the left or right of the initially predetermined positions;
receiving a signal to move the ON and OFF positions of the pixels from the user and then moving the ON and OFF positions of the pixels to the left or to the right in response to an input of the user by performing fine-tuning; and
when receiving an OK signal from the user, determining ON and OFF positions of the pixels at the time of receipt of the OK signal as the alignment positions between the lenticular lens and the left-eye and right-eye image pixels.

13. A glass-free stereoscopic image display device comprising:
a display module that displays a stereoscopic image through a cover including a lenticular lens including multiple convex lenses; and
a processor that controls the display module,
wherein the processor:
measures a viewing position of an user for the glass-free stereoscopic image display device through a camera connected with the glass-free stereoscopic image display device,
adjusts a distance between left-eye image pixels of the display module or a distance between right-eye image pixels of the display module, based on a lens pitch, which indicates a distance between the multiple convex lenses of the cover positioned at a front surface of the glass-free stereoscopic image display device, and the viewing position,
provides a glass-free stereoscopic image by controlling a left-eye image pixel and a right-eye image pixel of the display module on the basis of the distance between left-eye image pixels of the display module or the distance between right-eye image pixels of the display module so that an image which occurs on the display module and passes through the cover is provided as the glass-free stereoscopic image for the user,
the viewing position refers to a position where a right eye and a left eye of the user are placed.

14. A glass-free stereoscopic image display method performed by a processor of a user device, comprising:
providing a stereoscopic image by controlling a left-eye image pixel and a right-eye image pixel of a display module of the user device,
wherein the providing of a stereoscopic image comprises,
measuring a viewing position of an user for the user device through a camera connected with the user device,
adjusting a distance between left-eye image pixels of the display module or a distance between right-eye image pixels of the display module, based on a lens pitch, which indicates a distance between the multiple convex lenses of a lenticular lens included in the cover positioned at a front surface of the user device, and the viewing position, and
displaying a glass-free stereoscopic image by controlling pixels of the display module on the basis of the distance between left-eye image pixels of the display module or the distance between right-eye image pixels of the display module so that an image which occurs on the display module and passes through the cover including the lenticular lens is provided as the glass-free stereoscopic image for the user,
the viewing position refers to a position where a right eye and a left eye of the user are placed.

* * * * *